(12) United States Patent
Friedlander et al.

(10) Patent No.: US 7,584,160 B2
(45) Date of Patent: Sep. 1, 2009

(54) SYSTEM AND METHOD FOR OPTIMIZING PROJECT SUBDIVISION USING DATA AND REQUIREMENTS FOCUSES SUBJECT TO MULTIDIMENSIONAL CONSTRAINTS

(75) Inventors: Robert R. Friedlander, Southburry, CT (US); Anwer Mujahid Khan, New York, NY (US); Richard A. Hennessy, Austin, TX (US); James R. Kraemer, Santa Fe, CA (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 11/553,526

(22) Filed: Oct. 27, 2006

(65) Prior Publication Data
US 2008/0114779 A1    May 15, 2008

(51) Int. Cl.
*G06F 7/00* (2006.01)
(52) U.S. Cl. .......................... 706/45; 707/100
(58) Field of Classification Search .................. None
See application file for complete search history.

(56) References Cited

U.S. PATENT DOCUMENTS

| | | | |
|---|---|---|---|
| 4,890,227 A * | 12/1989 | Watanabe et al. | 706/14 |
| 5,070,453 A * | 12/1991 | Duffany | 705/8 |
| 5,128,871 A * | 7/1992 | Schmitz | 716/17 |
| 5,764,740 A * | 6/1998 | Holender | 379/112.05 |
| 5,880,598 A * | 3/1999 | Duong | 326/41 |
| 6,021,403 A | 2/2000 | Horvitz et al. | |
| 6,076,166 A | 6/2000 | Moshfeghi et al. | |
| 6,212,524 B1 | 4/2001 | Weissman et al. | |
| 6,484,155 B1 | 11/2002 | Kiss et al. | |
| 6,675,159 B1 | 1/2004 | Lin et al. | |
| 6,905,816 B2 | 6/2005 | Jacobs et al. | |
| 6,954,736 B2 * | 10/2005 | Menninger et al. | 705/28 |
| 7,181,428 B2 | 2/2007 | Lawrence | |
| 7,213,009 B2 | 5/2007 | Pestotnik et al. | |
| 7,295,925 B2 | 11/2007 | Breed et al. | |
| 7,403,922 B1 | 7/2008 | Lewis et al. | |
| 2003/0140063 A1 | 7/2003 | Pizzorno et al. | |

(Continued)

OTHER PUBLICATIONS

Analytical Effectiveness of Mathematical Models for R&D Project Selection Author(s): William E. Souder Source: Management Science, vol. 19, No. 8, Application Series (Apr. 1973), pp. 907-923.*

(Continued)

*Primary Examiner*—David R Vincent
*Assistant Examiner*—Ola Olude-Afolabi
(74) *Attorney, Agent, or Firm*—Yee & Associates, P.C.; John R. Pivnichny

(57) ABSTRACT

A computer-implemented method for creating optimized sub-projects for a project. Boundary conditions, input regarding output objects, and input regarding "as-is" data sources are received. The output objects are decomposed into data objects and logical processes used to create the output objects. Value clusters are determined. The data objects are organized into "to be" data structures and the "to be" which are mapped to the "as-is" data sources. Additional processes are determined for moving data from a source to a target. An affinity matrix is created based on the value clusters. Finally, an optimization operation is executed with an optimization engine to produce the optimized sub-projects. The optimization engine takes as inputs the above information.

20 Claims, 15 Drawing Sheets

U.S. PATENT DOCUMENTS

| | | |
|---|---|---|
| 2003/0177038 A1 | 9/2003 | Rao |
| 2004/0122787 A1 | 6/2004 | Avinash et al. |
| 2005/0038608 A1 | 2/2005 | Chandra et al. |
| 2005/0149466 A1 | 7/2005 | Hale et al. |
| 2005/0165594 A1 | 7/2005 | Chandra et al. |
| 2006/0036560 A1 | 2/2006 | Fogel |
| 2006/0069514 A1 | 3/2006 | Chow et al. |
| 2006/0155627 A1 | 7/2006 | Horowitz |
| 2006/0200435 A1* | 9/2006 | Flinn et al. ............... 706/12 |
| 2007/0073654 A1 | 3/2007 | Chow et al. |
| 2007/0073754 A1 | 3/2007 | Friedlander et al. |
| 2007/0174090 A1 | 7/2007 | Friedlander et al. |
| 2007/0174091 A1 | 7/2007 | Friedlander et al. |
| 2007/0185737 A1 | 8/2007 | Friedlander et al. |
| 2007/0203872 A1* | 8/2007 | Flinn et al. ............... 706/62 |
| 2007/0244701 A1 | 10/2007 | Erlanger et al. |
| 2007/0274337 A1* | 11/2007 | Purpura ................ 370/465 |
| 2008/0015871 A1* | 1/2008 | Eder ..................... 705/1 |
| 2008/0065576 A1 | 3/2008 | Friedlander et al. |
| 2008/0077463 A1 | 3/2008 | Friedlander et al. |
| 2008/0082356 A1 | 4/2008 | Friedlander et al. |
| 2008/0082374 A1 | 4/2008 | Kennis et al. |
| 2008/0172352 A1 | 7/2008 | Friedlander et al. |
| 2008/0177687 A1 | 7/2008 | Friedlander et al. |
| 2008/0177688 A1 | 7/2008 | Friedlander et al. |
| 2008/0208801 A1 | 8/2008 | Friedlander et al. |
| 2008/0208813 A1 | 8/2008 | Friedlander et al. |
| 2008/0208814 A1 | 8/2008 | Friedlander et al. |
| 2008/0208832 A1 | 8/2008 | Friedlander et al. |
| 2008/0208838 A1 | 8/2008 | Friedlander et al. |
| 2008/0208875 A1 | 8/2008 | Friedlander et al. |
| 2008/0208901 A1 | 8/2008 | Friedlander et al. |
| 2008/0208902 A1 | 8/2008 | Friedlander et al. |
| 2008/0208903 A1 | 8/2008 | Friedlander et al. |
| 2008/0208904 A1 | 8/2008 | Friedlander et al. |

OTHER PUBLICATIONS

Cooperative software development: concepts, model and tools Altmann, J.; Pomberger, G.; Technology of Object-Oriented anguages and Systems, 1999. TOOLS 30. Proceedings Aug. 1-5, 1999 pp. 194-207 Digital Object Identifier 10.1109/TOOLS.1999.787549.*

Research on resource scheduling for development process of complicated product Shou-qi Cao; Yun Chen; Yan-ling Han; Ming-lun Fang; Computer Supported Cooperative Work in Design, 2005. Proceedings of the Ninth International Conference on vol. 1, May 24-26, 2005 pp. 229-233 vol. 1.*

Research on organization method of development activities for complicated product Ming Chen; Shou-qi Cao; Yun Chen; Yan-ling Han; Ming-lun Fang; Computer Supported Cooperative Work in Design, 2005. Proceedings of the Ninth International Conference on vol. 1, May 24-26, 2005 pp. 234-239 vol. 1.*

U.S. Appl. No. 11/416,973, filed May 2, 2006, Friedlander et al.
U.S. Appl. No. 11/516,954, filed Sep. 7, 2006, Friedlander et al.
U.S. Appl. No. 11/874,382, filed Oct. 18, 2007, Friedlander et al.
U.S. Appl. No. 12/130,779, filed May 30, 2008, Friedlander et al.
U.S. Appl. No. 12/121,947, filed May 16, 2008, Angell et al.
U.S. Appl. No. 12/135,972, filed Jun. 9, 2008, Angell et al.
U.S. Appl. No. 12/135,960, filed Jun. 9, 2008, Angell et al.
U.S. Appl. No. 12/243,825, filed Oct. 1, 2008, Angell et al.
Luckham et al., "Event Processing Glossary", May 2008, Retrieved Jun. 9, 2008, pp. 1-13, <http://complexevents.com/?p=361>.
"AHRQ Quality Indicators—Patient Safety Indicators—Technical Specifications", Department of Health and Human Services Agency for Healthcare Research and Quality, Version 3.1, Mar. 12, 2007, pp. 1-107, <http://www.qualityindicators.ahrq.gov>.

* cited by examiner

FIG. 16
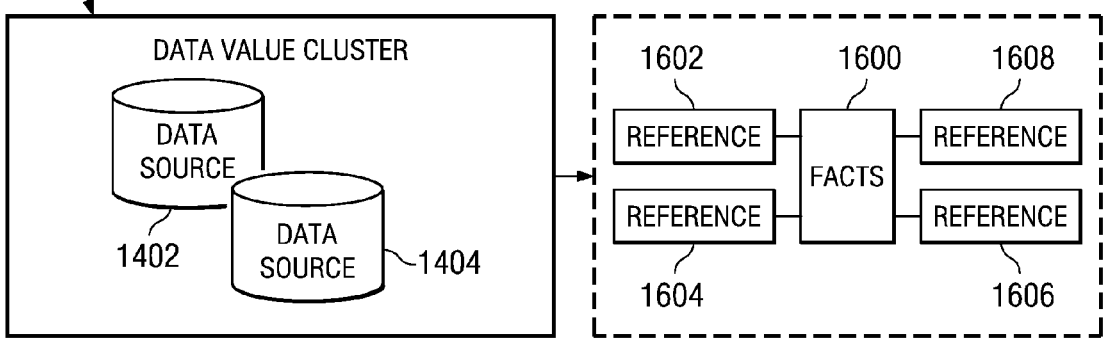
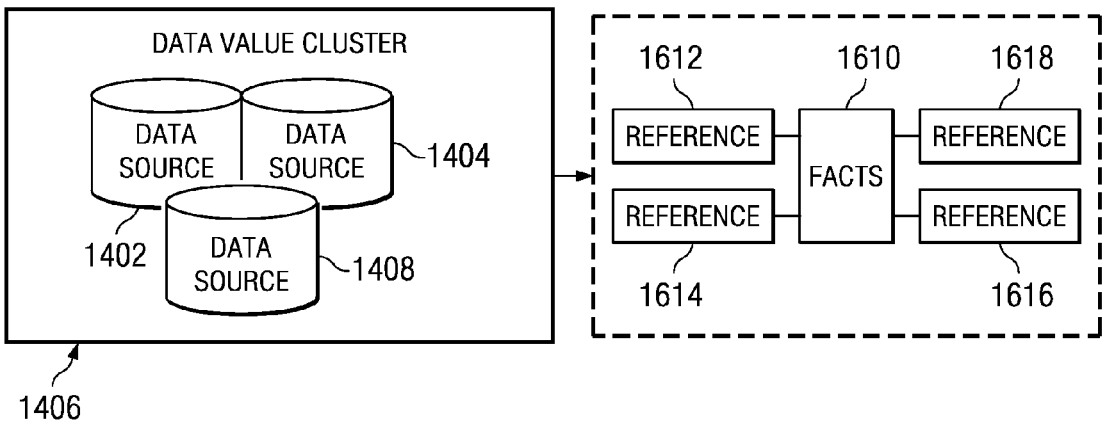
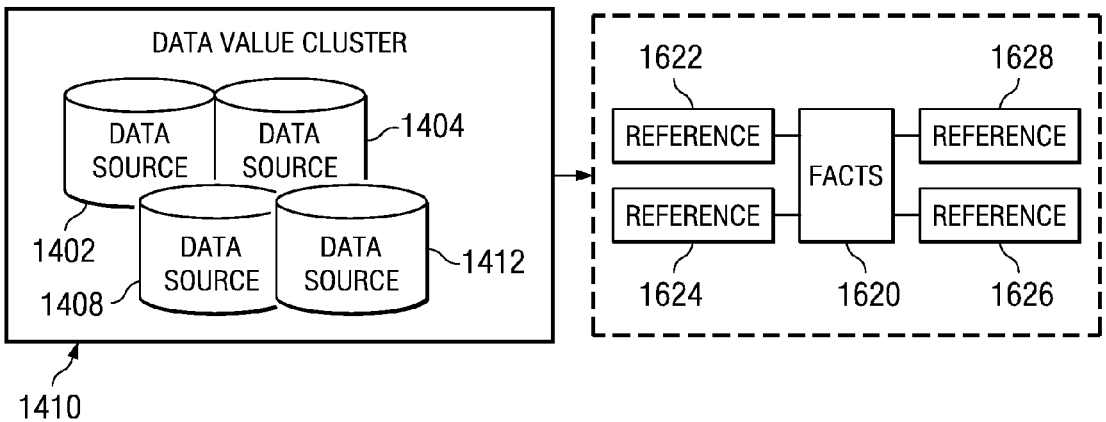

| AFFINITY MATRIX 1800 | | DATA SOURCE 1806 | DATA SOURCE 1808 | DATA SOURCE 1810 | DATA SOURCE 1812 | DATA SOURCE 1814 |
|---|---|---|---|---|---|---|
| 1202 | REPORT DATA STRUCTURE | 0 | 0 | 0 | 0 | 1 |
| 1204 | SCREEN DATA STRUCTURE | 0 | 0 | 0 | 1 | 0 |
| 1206 | PRODUCTION SCHEDULE DATA STRUCTURE | 1 | 1 | 1 | 0 | 0 |
| 1208 | DELIVERABLE DATA STRUCTURE | 0 | 1 | 0 | 1 | 1 |
| 1302 | APPLICATION DATA STRUCTURE | 1 | 0 | 1 | 0 | 0 |
| 1304 | APPLICATION DATA STRUCTURE | 0 | 0 | 0 | 1 | 1 |
| 1306 | FLOW DATA STRUCTURE | 1 | 1 | 0 | 0 | 0 |
| 1308 | FLOW DATA STRUCTURE | 0 | 1 | 0 | 0 | 0 |
| 1818 | PERSONAL SKILLS PROGRAM DATA STRUCTURE | 0 | 1 | 0 | 0 | 0 |
| 1820 | OPPORTUNITIES DATABASE FOR SALES DATA STRUCTURE | 0 | 1 | 0 | 0 | 1 |

*FIG. 18*

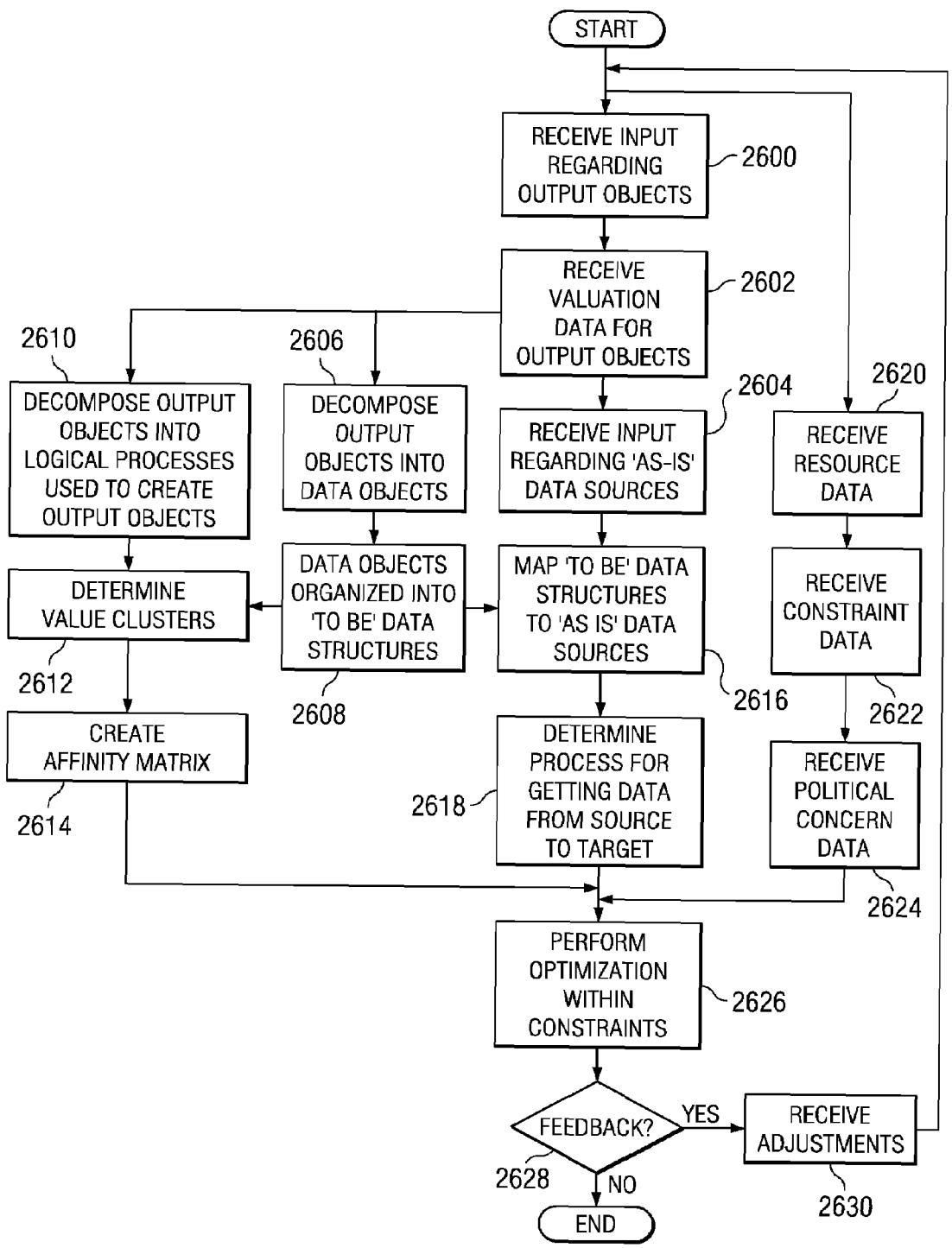

SYSTEM AND METHOD FOR OPTIMIZING PROJECT SUBDIVISION USING DATA AND REQUIREMENTS FOCUSES SUBJECT TO MULTIDIMENSIONAL CONSTRAINTS

BACKGROUND OF THE INVENTION

1. Field of the Invention

The present invention relates generally to data processing and an improved data processing system. More specifically, the present invention relates optimized approaches to creating large information technology systems.

2. Description of the Related Art

Large corporations or other large entities use information technology systems to manage their operations. An information technology system is a system of data processing systems, applications, data, reports, flows, algorithms, databases, and other infrastructure used to maintain the data and operations of the organization. A large scale information technology system is not necessarily located in one single physical location, but can be situated in many different physical sites implemented using numerous physical devices and software components. A large scale information technology system can be referred to as a major information technology system.

Major information technology system projects, such as those used by large corporations, often fail and some fail disastrously. Failure often costs millions of dollars, tens of millions of dollars, or even more in wasted time, manpower, and physical resources. Thus, substantial effort is usually exerted in planning the construction of a major information technology system. Planning construction of a major information technology system, at least in theory, reduces the chances of failure.

Major information technology systems projects are beyond the abilities of a single individual to implement alone. Likewise, construction of major information technology system projects can not be viewed as a single monolithic project due to the vastness and complexity of these system projects. Thus, major information technology system projects are often constructed in phases using groups of sub-projects. Various groups of people work to complete each sub-project. As work progresses, the sub-projects are assimilated together in order to create the major information technology system project.

However, even with planning and the use of sub-projects, most major information technology system projects fail or are never completed. Even if the major information technology system project is implemented, the resulting major information technology system project does not function optimally with respect to maximizing the efficiency of the organization for which the major information technology system project is constructed. For example, subsets of the whole major information technology system project may not match data, business requirements, and/or resources in an optional manner. As a result, the organization suffers from the inefficiencies of the final major information technology system project. Correcting or adjusting these inefficiencies may be cost prohibitive due to the fundamental nature of how the major information technology system project was constructed.

The most typical reason for failure or inefficiency of these system projects is that the construction of these system projects is approached from a non-data centric viewpoint. Instead, design of sub-projects of major information technology system projects often is performed by managers, executives, or others who are experts at understanding where a business should go or how a business should operate, but are not technically proficient at implementing or constructing a major information technology system project. As a result, the sub-projects "look good on paper" but, when implemented, fail or, if successful individually, can not be integrated together in a desired manner. An entire major information technology system project may fail or be inefficient if sub-projects that were designed to build the major information technology system projects can not be integrated. Currently available methods and system projects do not provide a means to reliably create efficient major information technology system projects. Therefore, it would be advantageous to have an improved method and apparatus for creating optimized sub-projects useful for creating and implementing a major information technology project.

SUMMARY OF THE INVENTION

A computer-implemented method, computer program product, and data processing system are provided for creating optimized sub-projects for a project. Boundary conditions, input regarding output objects, and input regarding "as-is" data sources are received. The output objects are decomposed into data objects and the output objects are also decomposed into logical processes used to create the output objects. Value clusters are determined. The data objects are organized into "to be" data structures and the "to be" data structures are mapped to the "as-is" data sources. Additional processes are determined for moving data from a source to a target. An affinity matrix is created based on the value clusters. Finally, an optimization operation is executed with an optimization engine to produce the optimized sub-projects. The optimization engine takes as inputs the boundary conditions, the "as-is" data sources, the data objects, the logical processes used to create the output objects, the value clusters, the "to be" data structures; the mapping of the "to be" data structures to the "as-is" data sources, the additional processes for moving data from the source to the target, and the affinity matrix.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 16 is a block diagram illustrating elements of a "to be" data model, in accordance with an illustrative embodiment;

FIG. 18 is an exemplary affinity matrix, in accordance with an illustrative embodiment;

FIG. 26 is a flowchart illustrating a computer-implemented method of creating optimized sub-projects for a major information technology project, in accordance with an illustrative embodiment.

DETAILED DESCRIPTION OF THE PREFERRED EMBODIMENT

Figure 1:
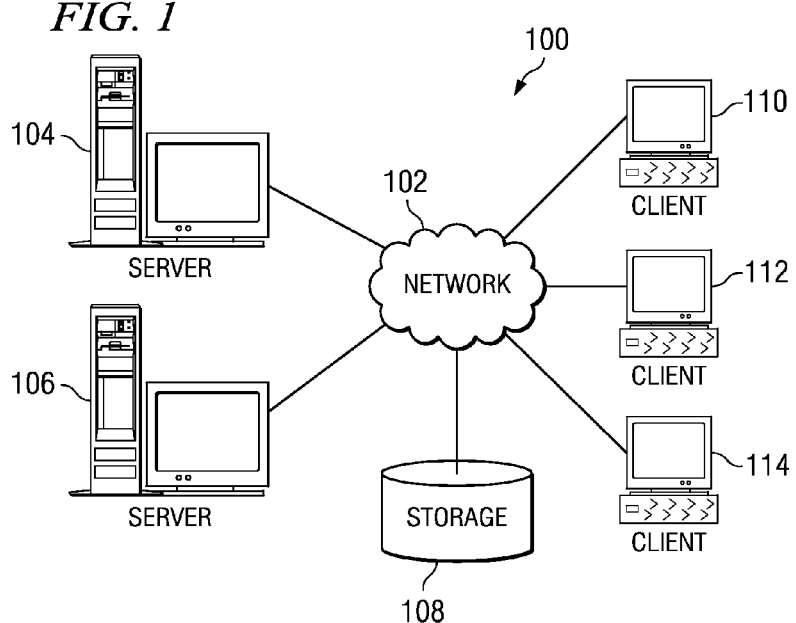
FIG. 1 is a pictorial representation of a network of data processing systems in which illustrative embodiments may be implemented.
Figure 2:
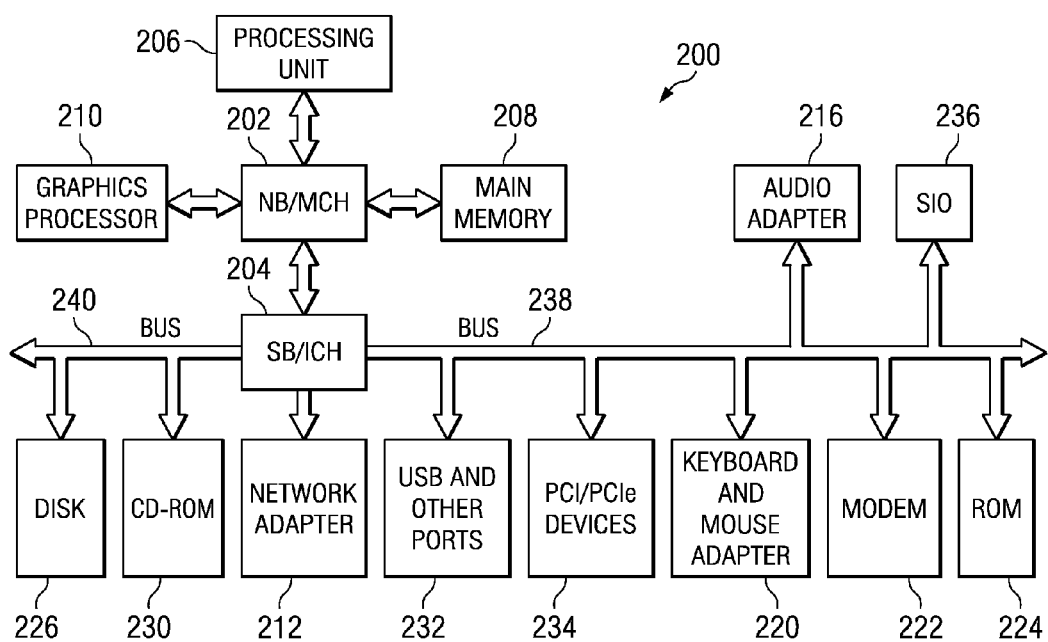
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

FIG. 2 is a block diagram of a data processing system in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc., in the United States, other countries, or both).

Instructions for the operating system, the object-oriented programming system, and applications or programs are located on storage devices, such as hard disk drive 226, main memory 208, tape drives, or any other form of memory or storage for data, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A computer-implemented method, computer program product, and data processing system are provided for creating an optimized major information technology project having optimally selected optimized sub-projects. An optimized sub-project is a set of data representing a portion of the project. For example, an optimized sub-project could be a set of data that describes how physical data processing systems should be setup relative to each other. Another example of an optimized sub-project could be a set of data that describes how business reports should be generated, what information should be included in the business reports, who should receive the business reports and the order in which the business reports should be generated. Many other examples of optimized sub-projects exist.

As part of an exemplary process, one or more data processing systems receive boundary conditions, input regarding output objects, and input regarding "as-is" data sources. An "as-is" data source is an existing data source. Boundary conditions include all data that places one or more boundaries on a project. Examples of boundary conditions include resource data and constraint data. Resource data reflects resources available for the project, such as money and manpower. Constraint data includes constraints imposed on the project, such as data reflecting deadlines, legal requirements, data availability, and others. A special type of constraint data is data regarding political concerns. Data reflecting political concerns includes data that reflects political realities, such as resource allocation among organizational departments, timing of deliverables, and work allocation.

Examples of input regarding output objects include data reflective of output objects. Output objects are those outputs or deliverables that the project is designed to deliver. Specific examples of output objects include screens showing particular information, pictures, or query results; interactive graphical user interfaces; reports; services delivered, including deliverables; applications; queries; applications, flows, and algorithms; combinations thereof, and others.

Data regarding "as-is" data sources is data reflective of available data sources. Examples of "as-is" data sources can include available databases, available files, available hard-copy paper files, and other data sources. An "as-is" data source is not a data source that is yet to be developed or that is yet to be placed into a desired form. An "as-is" data source is distinguished from a "to be" data source. A "to be" data source is a data source that is not yet in existence or is not yet in a desired form, but that has been modeled or can be modeled.

Once the boundary conditions, input regarding output objects, and input regarding "as-is" data sources are received, the output objects are decomposed into data objects. A data object is a data structure that contains data reflective of an output object. A data object can be an "object" as that term is used in object-oriented programming for computer languages such as C++ and Java.

The term "decompose," which also includes the concept of factoring in computer science, refers to the process by which a complex problem or system is broken down into parts that are easier to conceive, understand, program, and maintain. In structured programming, algorithmic decomposition breaks a process down into well-defined steps. In object-oriented programming, one breaks a large system down into progressively smaller classes or objects that are responsible for some part of the problem domain. An object, process, data, or flow can be "decomposed" in a mathematical, data-centric manner according to many known methods.

Additionally, the output objects are also decomposed into process data objects, which are data objects reflective of logical processes used to create the output objects. A logical process used to create an output object can be any application, flow, algorithm, or similar process for creating an output object. Such flows can also be characterized as "objects" as that term is used in object-oriented programming.

The illustrative examples also include determining value clusters. A value cluster is the discrete intersection of data and that data's ability to add value to an organization. A value cluster may also be considered a group of resources that, when taken together, support one or more output objects having a utility value to an organization. A value cluster may be considered one of a data value cluster and a process value cluster. A data value cluster includes one or more data sources that support one or more data objects. A process value cluster includes one or more logical processes that support one or more output objects.

Next, the data objects are organized into "to be" data structures to form a "to be" data model and the "to be" data structures are mapped to the "as-is" data sources. The phrase "to be", as used herein, describes something that is desired for the major information technology project that may, or may not, yet exist. The phrase "to be" also can be referred to as "future" or "future model." Thus, a "to be" data model is a model or other description of a future data model. A "to be" data structure is data assembled into data models appropriate to producing one or more output objects. A "to be" data structure therefore includes one or more data objects, as defined above. Different parts of the "to be" data model may be at different levels of completeness. An example of a "to be" data structure is a data structure that shows the "skeleton" of a massive database that is to be constructed. Although not all information regarding the future database is available, the "to be" model of the database describes the structure of the database and what information it should contain.

Continuing with the illustrative example, the "to be" data structures are mapped to the "as-is" data sources. An "as-is" data source is an existing source of data. The existing source of data may not be complete, may not be of sufficient quality, and may not be in a format desired for the completed project; nevertheless, the "as-is" data sources may be adequate for the completed project.

Next, additional processes are determined for moving data from a source to a target. For example, a process can be determined for summarizing raw patient data and turning that raw patient data into a report for a hospital executive or for a doctor. Additionally, transformation issues are incorporated into the processes, such as estimating the costs and risks of moving data from a source to a destination in the correct format.

The exemplary embodiment also includes creating an affinity matrix based on the value clusters. An affinity matrix is a matrix of data that indicates a relationship between groups of data sources and groups of output objects, and/or groups of available logical processes and groups of output objects. The affinity matrix describes data sources and output objects in terms of what output objects are available based on what data sources are available. Thus, for example, the affinity matrix can allow a user to determine that if Output Object "X" is available because its data sources are available, then Output Object "Y" and Output Object "Z" are also available because they use similar data sources.

Finally, an optimization operation is executed with an optimization engine to produce the optimized sub-projects. The optimization engine takes as inputs the boundary conditions, the "as-is" data sources, the data objects, the logical processes used to create the output objects, the value clusters, the "to be" data structures; the mapping of the "to be" data structures to the "as-is" data sources, the additional processes for moving data from the source to the target, and the affinity matrix.

Optimization, as used herein, is the mathematical study of problems in which a minimum or a maximum for a function of a real variable is sought by systematically choosing the values of the real number or integer variables from within an allowed set. The problem can be mathematically represented as follows:

Given: A function f: A→R from some set A to the real numbers. Sought: An element $x_0$ in A such that $f(x_0) \leq f(x)$ for all x in A ("minimization") or such that $f(x_0) \geq f(x)$ for all x in A ("maximization").

Typically, A is some subset of the Euclidean space Rn, often specified by a set of constraints, equalities or inequalities that the members of A have to satisfy. The elements of A are called feasible solutions. The function f is called an objective function, or cost function. A feasible solution that minimizes or maximizes the objective function is called an optimal solution. The domain A of f is called the search space, while the elements of A are called candidate solutions or feasible solutions.

Generally, when the feasible region or the objective function of the problem does not present convexity, there may be several local minima and maxima, where a local minimum x* is defined as a point for which there exists some δ>0 so that for all x such that $$\|x-x^*\| \leq \delta;$$

the expression $$f(x^*) \leq f(x)$$

holds. In other words on some region around x* all of the function values are greater than or equal to the value at that point. Local maxima are defined similarly.

Commercial optimization engines are available and can be used with the illustrative examples described herein. Examples of commercial optimization engines include Optimization Subroutine Library and MPSX (Mathematical Programming System Extended), both available from International Business Machines Corporation, ILOG Cplex, and GLPK (Gnu Linear Programming Kit). Thus, as defined herein, the term "optimized sub-project" refers to a mathematically defined data structure that describes the structure of a sub-project and steps to be taken to implement a sub-project of a major project. Accordingly, described differently, the exemplary processes described herein provide a computer implemented method, apparatus, and computer usable program code for generating optimized sub-projects based on a weighted value of desired outputs mapped against source data, required transformations, boundaries, and an affinity matrix.

The project sought to be constructed using the illustrative embodiments described herein can be any large project. Examples of other large projects suitable for the planning techniques described herein include government agencies, outer-space programs, major military operations, and other major projects. However, the non-limiting embodiments described herein provide an illustrative example of creating a major information technology project.

Taken together, the group of optimized sub-projects can be assimilated into a plan an organization can follow to build the most efficient project plan possible. Because the plan is data-centric, an efficient major information technology project can be constructed even if the major information technology project is very large and complex.

Figure 7:
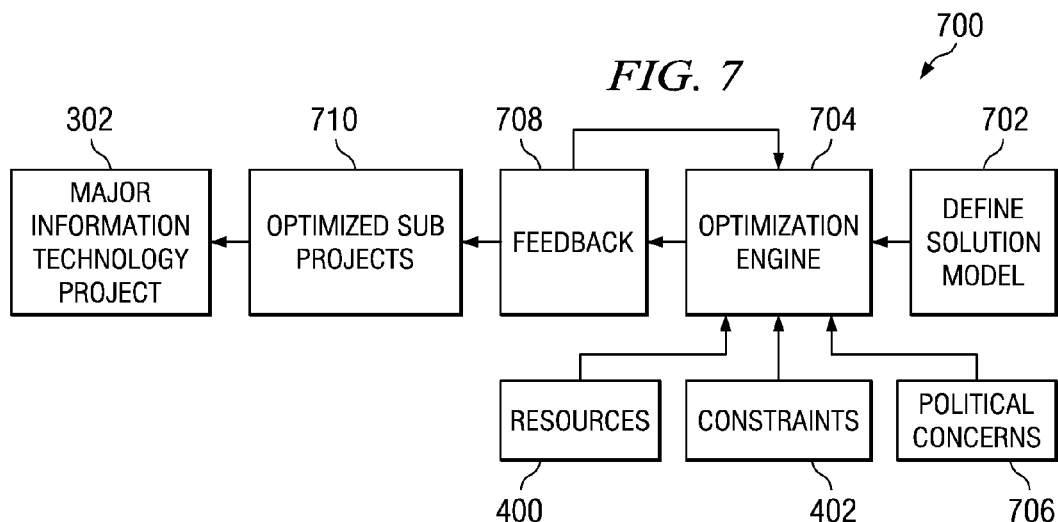
FIG. 7 is a block diagram illustrating a computer-implemented method of creating optimized sub-projects for a major information technology project, in accordance with an illustrative embodiment.
Figure 8:
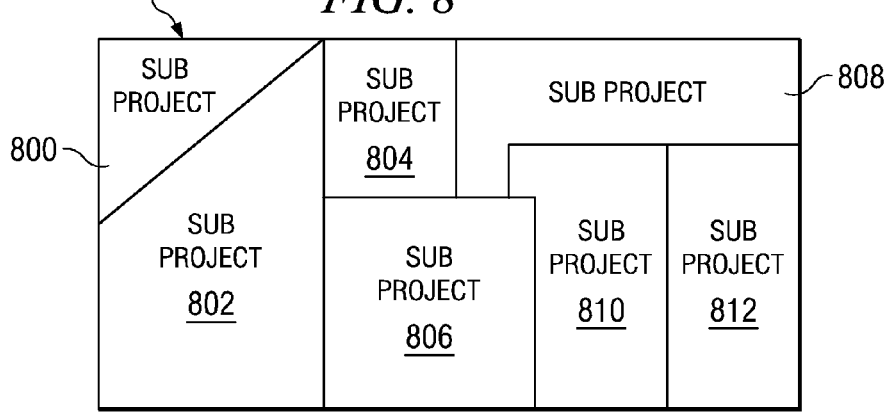
FIG. 8 is a block diagram illustrating optimally selected sub-projects for a major information technology project, in accordance with an illustrative embodiment.
Figure 9:
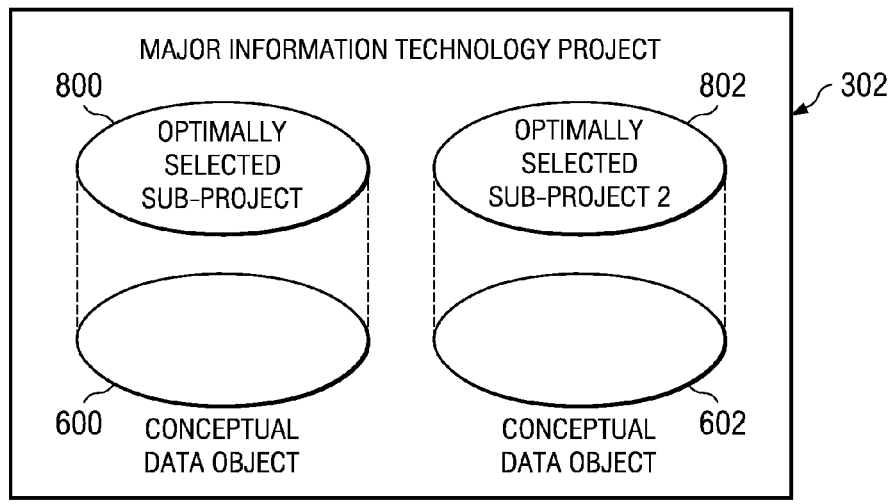
FIG. 9 is a block diagram illustrating major information technology sub-projects that efficiently overlap underlying realities of existing information technology systems, in accordance with an illustrative embodiment.
Figure 10:
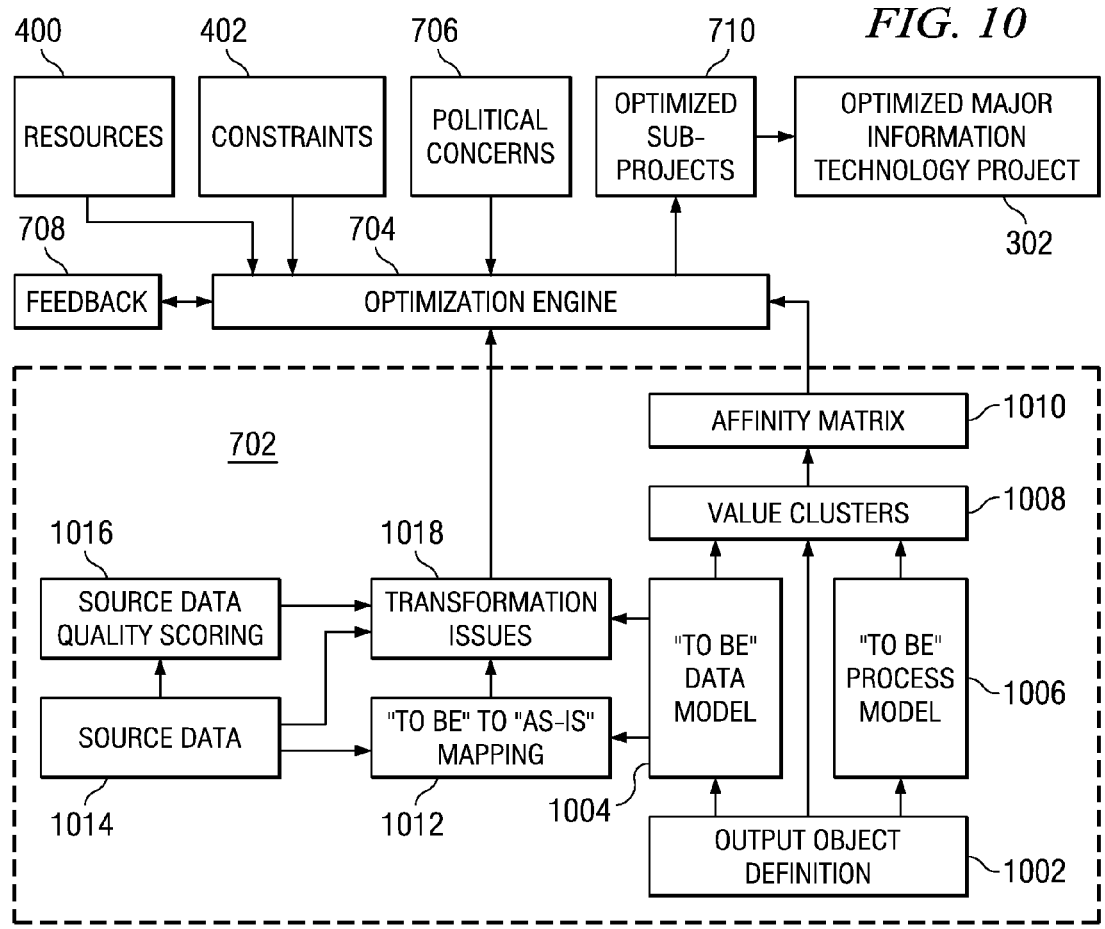
FIG. 10 is a block diagram illustrating a method of creating optimized sub-projects for a major information technology project, in accordance with an illustrative embodiment.
Figure 24:
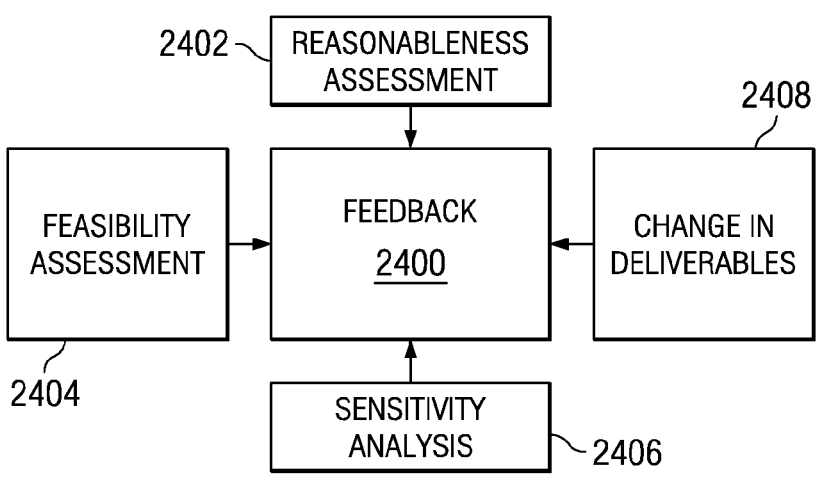
FIG. 24 is a block diagram illustrating examples of feedback applied to an optimization engine, in accordance with an illustrative embodiment.
Figure 25:
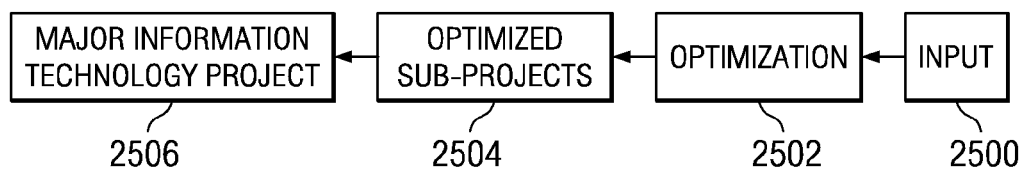
FIG. 25 is a block diagram illustrating a computer-implemented method of creating optimized sub-projects for a major information technology project, in accordance with an illustrative embodiment.

The following figures describe in detail the problem to be solved, the inadequacies of the prior art, and examples of the solution to the problem to be solved. FIG. 3 through FIG. 6 describe the problem to be solved and the inadequacies of the prior art. FIG. 7 through FIG. 9 illustrate a summary of an illustrative embodiment for solving the problem described in FIG. 3 through FIG. 6. FIG. 10 through FIG. 10 through FIG. 24 provide a detailed description of the devices and methods useful for implementing the illustrative embodiments described herein. FIG. 25 provides another overview of an illustrative embodiment for solving the problem of planning a project. FIG. 26 is a flowchart illustrating an illustrative embodiment of planning a major information technology project.

As specified above, FIG. 3 through FIG. 6 describe the problem to be solved and the inadequacies of the prior art. Common reference numerals used in different figures correspond to each other. Thus, for example, major information technology project 302 is the same in FIG. 3, FIG. 4, FIG. 5, and FIG. 6.

Figure 3:
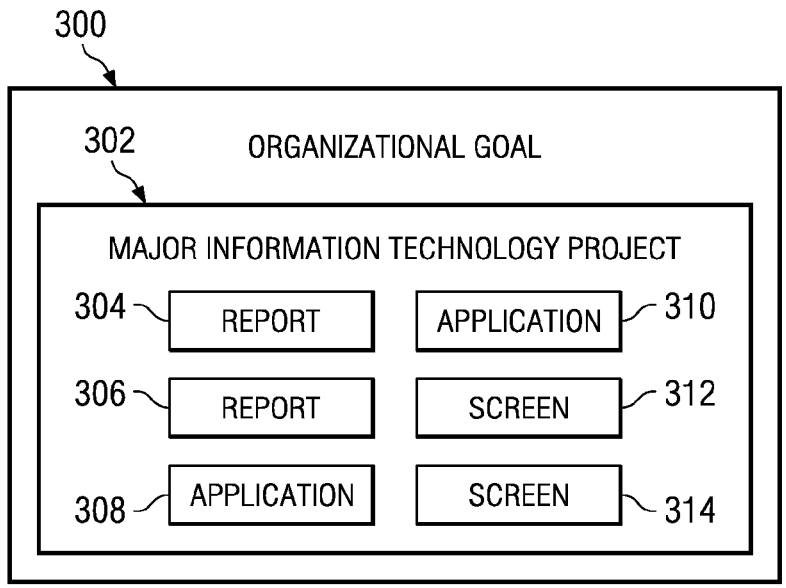
FIG. 3 is a block diagram illustrating a major information technology project, in accordance with an illustrative embodiment.

Referring now to the particular figures, FIG. 3 is a block diagram illustrating a major information technology project, in accordance with an illustrative embodiment. An organization has organizational goal 300 that the organization desires to implement. The goal may be to create a hospital system, a new government agency, a new major corporation, or any other goal. In the illustrative embodiments described herein, organizational goal 300 is a large scale goal similar to those described in the previous examples.

As part of organizational goal 300, major information technology project 302 is to be implemented to create a large scale information technology system project. An information technology system project is a system of data processing systems, applications, data, reports, flows, algorithms, databases, and other infrastructure used to maintain the data and operations of the organization. A large scale information technology system project is not necessarily located in one single physical location, but can be situated in many different physical sites implemented using numerous physical devices and software components. A large scale information technology system project can be referred to as a major information technology system project.

Major information technology project 302 has as goals one or more output objects. Output objects are those outputs or deliverables that the project is designed to deliver. Specific examples of output objects include report 304, report 306, application 308, application 310, screen 312, and screen 314.

A report is any type of output of a query or process. For example, a report could be a list of the number of patients having a particular set of properties. A report could also be a quarterly financial statement or any other type of report as that word is commonly known in business.

An application is any type of software application. An application can also be a script, flow, or other process that can be implemented in a computer.

A screen can be any graphical user output of an application. A screen can be a graphical user interface adapted to accept user input. For example, a screen could be a graphical user interface adapted to accept a query for a database, or a screen could be a graphical user interface adapted to accept data for entry into a database. A screen can also display a report.

Although major information technology project 302 is expressed as having output objects 304, 306, 308, 310, 312, and 314, many other types of output objects could also exist. For example, other types of output objects could be application, database, data cube, data structure, flat file of data, a graph, a directed graph, a project plan, an automated control system, a virtual reality visualization, a printed report, an on-screen representation of a printed report, a Web page, an email, an XML (Extended Markup Language) data structure, a document, a submission for an organization such as a government agency (like a FDA submission), an alert, a natural language representation of data, and a notification list. Other types of output objects exist.

Figure 4:
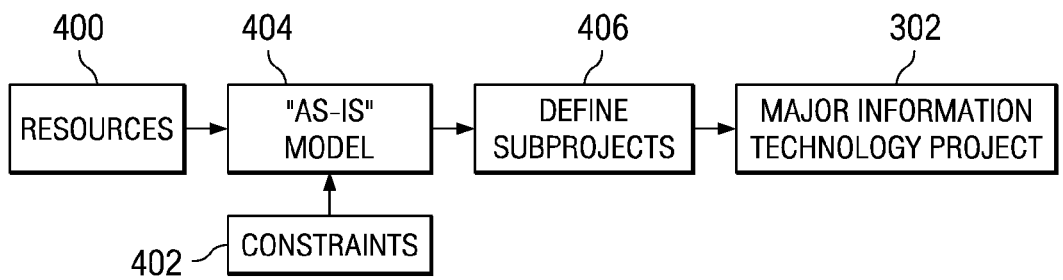
FIG. 4 is a block diagram of a prior art method of constructing a major information technology project.

FIG. 4 is a block diagram of a prior art method of constructing a major information technology project. The method shown in FIG. 4 can be implemented in one or more data processing systems, such as data processing systems 104, 106, 110, 112, and 114 in FIG. 1 and data processing system 200 shown in FIG. 2. The method shown in FIG. 4 can be implemented among multiple computers over a network, such as network 102 shown in FIG. 1.

Once an organization has specified organization goal 300 and the output objects desired for major information technology project 302 of FIG. 3, the organization then has to cause major information technology project 302 to be created. In the prior art, the process of implementing major information technology project 302 is performed in a "left to right" manner.

Figure 21:
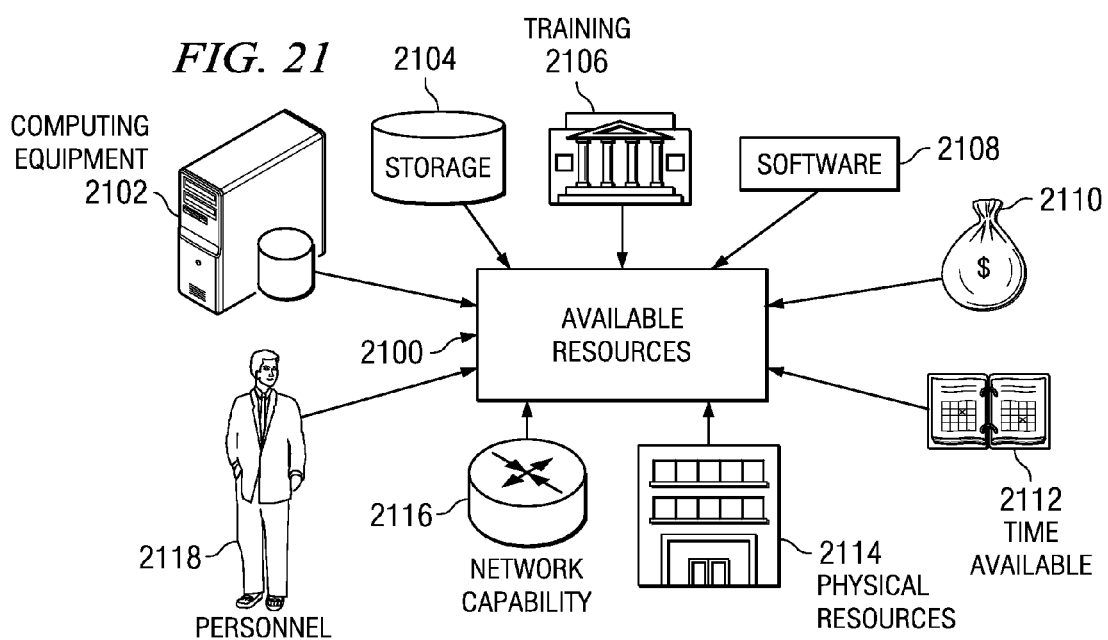
FIG. 21 is a block diagram illustrating exemplary available resources, in accordance with an illustrative embodiment.
Figure 22:
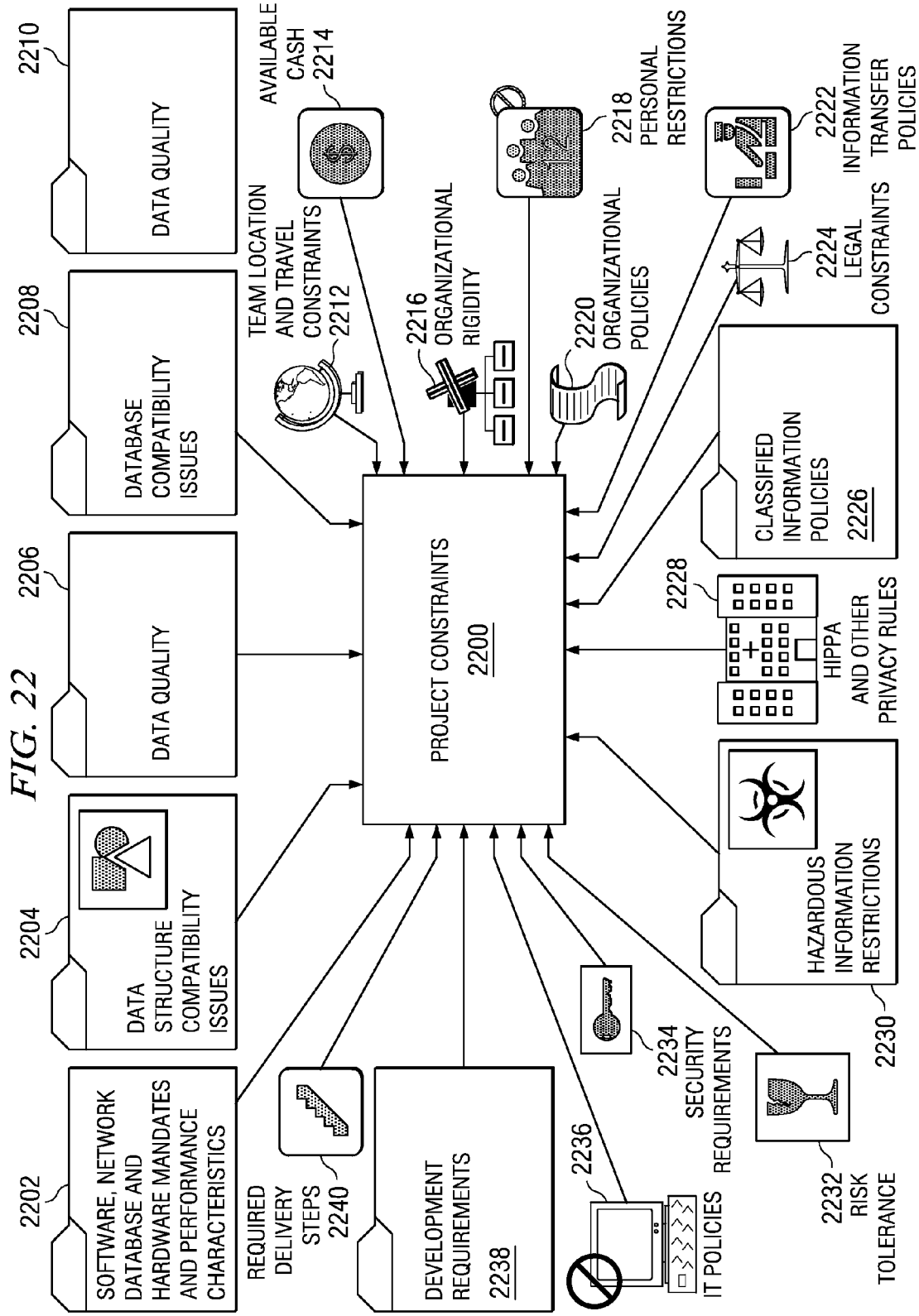
FIG. 22 is a block diagram illustrating exemplary project constraints, in accordance with an illustrative embodiment.

Specifically, one or more individuals identify all resources available 400 to the organization for major information technology project 302. Examples of resources are shown in FIG. 21, though can include items such as money, manpower, existing databases, existing software, and the like. Similarly, one or more individuals identify all constraints 402 imposed on the organization for major information technology project 302. Examples of constraints are shown in FIG. 22, though can include items such as legal constraints, security requirements, time constraints, and the like.

Resources 400 and constraints 400 are fed into "as-is" model 404. An "as-is" model describes all of the identified resources available to major information technology project 302 and all of the identified constraints imposed on major information technology project 302. Thus, an "as-is" model can be referred to as an existing model that describes existing resources. An "as-is" model can be reflected in a database or some other computer-readable format; however, often "as-is" model 404 is an ad-hoc report used by individuals to manually define subprojects 406. Thus, one or more individuals and/or one or more computer programs define subprojects 406. The sub-projects are then individually executed in a specified order, some of which are performed in parallel, to implement major information technology project 302.

Figure 5:
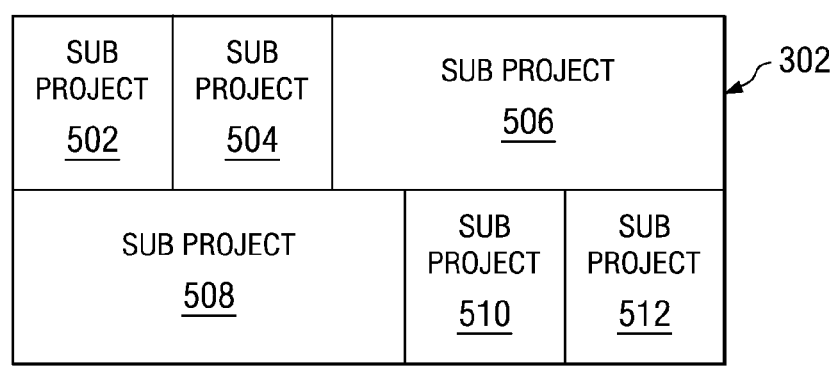
FIG. 5 is a block diagram of a set of sub-projects created using the prior art method shown in FIG. 4.

FIG. 5 is a block diagram of a set of sub-projects created using the prior art method shown in FIG. 4. As a result of performing the step of "define sub-projects 406" in FIG. 4, major information technology project 302 is divided up into sub-projects as shown. In the illustrative example of FIG. 5, major information technology project 302 includes six sub-projects; sub-project 502, sub-project 504, sub-project 506, sub-project 508, sub-project 510, and sub-project 512. Each sub-project is shown as having various different areas on the figure in order to show that each sub-project can have a different scale in terms of difficulty, size, or some other parameter. Most sub-projects are performed in a particular order, though some sub-projects could be performed in parallel.

Each sub-project reflects a particular aspect of building major information technology project 302. In a non-limiting example, each sub-project has a particular purpose described as follows. Sub-project 502 is a sub-project to implement the physical machinery and wiring used to implement major information technology project 302. Sub-project 504 is a project to create a new database used in major information technology project 302. Sub-project 506 is a project to create a new software application useful for performing temporal analysis on data. Sub-project 508 is a project to convert existing data to a new format. Sub-project 510 is a project to create a graphical user interface for interacting with the database to be defined in sub-project 504. Sub-project 512 is a project to develop a second database.

Although sub-projects 502 through 512 are described in terms of specific examples, many other types of sub-projects exit. Additionally, major information technology project 302 can include more or fewer sub-projects. Most major information technology project 302 would have many more sub-projects. Moreover, sub-projects 502 through 512 could each include one or more smaller sub-projects. Each smaller sub-project is used to plan construction of the corresponding larger sub-project. Conceivably, smaller sub-projects could also include deeper levels of sub-projects.

Figure 6:
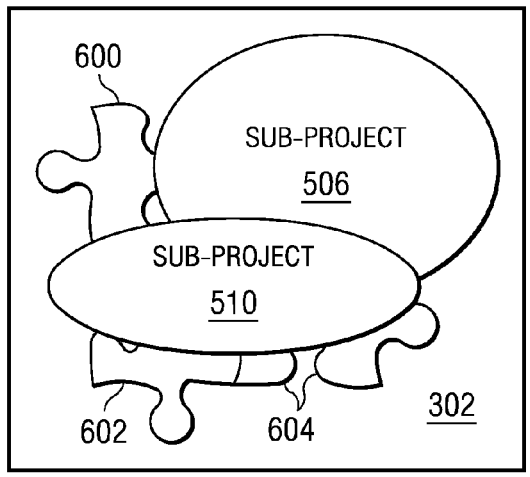
FIG. 6 is a block diagram illustrating major information technology sub-projects that inefficiently overlap underlying realities of existing information technology systems as a result of the prior art method shown in FIG. 4.

FIG. 6 is a block diagram illustrating major information technology sub-projects that inefficiently overlap underlying realities of existing information technology systems as a result of the prior art method shown in FIG. 4. As stated previously, the prior art method show in FIG. 4 of generating sub-projects for major information technology project 302 is unsatisfactory. The prior art method shown in FIG. 4 is unsatisfactory because the prior art method often results in total failure of major information technology project 302 or results in a final major information technology project that has unacceptable inefficiencies.

The cause of this result is illustrated in FIG. 6. In broad terms, the prior art method shown in FIG. 4 does not take into account the underlying technical realities of existing systems in "as-is" model 404. In other words, the prior art method shown in FIG. 4 is not data centric. A method of creating a major information technology project is data centric when the method is based on empirical data, even if the empirical data includes subjective considerations that have been reduced to data models.

For example, major information technology project 302 shows sub-project 506 and sub-project 510 as defined according to the method shown in FIG. 4. However, each of sub-project 506 and sub-project 510 overlap multiple "as-is" conceptual objects. An "as-is" conceptual object is some underlying physical information technology-related thing. An "as-is" conceptual object can be an existing conceptual object. For example, sub-project 510 overlaps all three of "as-is" data structure 600, "as-is" data structure 602, and "as-is" data structure 604. Similarly, sub-project 506 overlaps both "as-is" data structure 600 and "as-is" data structure 604. Although blocks 600, 602, and 604 are characterized as "as-is" data structures, one or more of these blocks could be replaced with "as-is" applications, databases, physical hardware, or other "as-is" conceptual objects.

The overlap of sub-projects to multiple "as-is" conceptual objects shown in FIG. 6 illustrates why the prior art method shown in FIG. 4 often fails. Because sub-projects are designed without taking into account the underlying "as-is" conceptual objects, work on sub-projects proceeds without having all pertinent information. Those working on sub-project 506 do not appreciate that "as-is" data structure 600 will impact construction of both sub-project 506 and sub-project 510. As a result, duplicative effort may take place, resulting in possibly gross inefficiency. Alternatively, "as-is" data structure is not modified to handle the workload imposed by both sub-project 506 and sub-project 510, resulting in failure of both projects.

As stated above, FIG. 7 through FIG. 9 illustrate a summary of an illustrative embodiment for solving the problem described in FIG. 3 through FIG. 6. Common reference numerals used in different figures correspond to each other. Thus, for example, major information technology project 302 is the same in FIG. 3 through FIG. 9.

In particular, FIG. 7 is a block diagram illustrating a computer-implemented method of creating optimized sub-projects for a major information technology project, in accordance with an illustrative embodiment. The method shown in FIG. 7 can be implemented in one or more data processing systems, such as data processing systems 104, 106, 110, 112, and 114 in FIG. 1 and data processing system 200 shown in FIG. 2. The method shown in FIG. 7 can be implemented among multiple computers over a network, such as network 102 shown in FIG. 1.

FIG. 7 illustrates a counter-intuitive method 700 of selecting a set of optimized sub-projects into a plan for creating an optimal project definition. Instead of proceeding from a "right to left" perspective shown in FIG. 4, the illustrative embodiment shown in FIG. 7 solves the problem of planning major information technology problem 302 from "left to right." Specifically, the term "left to right" in this context means that the illustrative process first defines a solution model 702, instead of defining the problem—as in FIG. 4.

The solution model 702, resources 400, constraints 402, and political concerns 706 are all described in terms of data that can be manipulated by a computer-implemented process. Thus, the definition of solution model 702, resources 400, constraints 402, and political concerns 706 are provided to optimization engine 704. An optimization engine is a computer-implementable software application that performs rigorously defined mathematically optimization, as defined above, on inputs 702, 706, 400, and 402.

After feedback 708, the output of optimization engine is an optimized major information technology project 302 having optimally selected sub-projects 710. The term "optimally selected sub-projects" means that the sub-projects were selected via a mathematical optimization project.

The process, however, usually proceeds through several adjustments and iterations in order to bring the optimized major information technology project 302 into closer agreement with expectations of those responsible for major information technology project 302. Thus, feedback process 708 allows a user or process to adjust one or more of solution model 702, resources 400, constraints 402, or political concerns 706 and then re-execute optimization engine 704.

Ultimately, the result of the process shown in FIG. 7 is an optimized major information technology project 302 having optimally selected sub-projects 710 that are in accord with expectations of those responsible for major information technology project 302. The process shown in FIG. 7 is data centric. In other words, the process shown in FIG. 7 is based on data and mathematical characterizations of factors important to major information technology project 302. As a result, as shown in FIG. 8 and FIG. 9, the optimally selected sub-projects 710 more closely reflect underlying realities of "as-is" conceptual objects. Thus, by using the method shown in FIG. 7, the probability of success of completing an efficient major information technology project 302 is greatly increased.

FIG. 8 is a block diagram illustrating optimally selected sub-projects for a major information technology project, in accordance with an illustrative embodiment. The optimally selected sub-projects shown in FIG. 8 are different than the non-optimally selected sub-projects shown in FIG. 6. Thus the shapes of sub-project 800, sub-project 802, sub-project 804, sub-project 806, sub-project 808, sub-project 810, and sub-project 812 are different than the various sub-projects shown in FIG. 6. Optimally selected sub-projects shown in FIG. 8 are part of major information technology project 302.

By implementing optimally selected sub-projects 800 through 812 in a particular order, which could be parallel implementation in some instances, the probability of successfully implementing major information technology project 302 is substantially increased.

FIG. 9 is a block diagram illustrating major information technology sub-projects that efficiently overlap underlying realities of existing information technology systems, in accordance with an illustrative embodiment. FIG. 9 illustrates why the process shown in FIG. 7 is superior to the prior art method shown in FIG. 3.

Unlike in FIG. 6, which is a result of the prior art method shown in FIG. 4, the shown optimally selected sub-projects directly overlap underlying conceptual data objects. For example, optimally selected sub-project 800 corresponds directly to conceptual data object 600 without overlapping conceptual data object 602. Similarly, optimally selected sub-project 802 directly corresponds to conceptual data object 602 without overlapping conceptual data object 600. Thus, duplicative effort is avoided and major information technology project 302 is much more efficiently produced. Additionally, major information technology project 302 operates more efficiently when completed.

FIG. 10 is a block diagram illustrating a method of creating optimized sub-projects for a major information technology project, in accordance with an illustrative embodiment. In particular, the method shown in FIG. 10 is a more detailed version of the method shown in FIG. 7. Thus, corresponding reference numerals shown in FIG. 10 correspond to like numerals shown in FIG. 7. The method shown in FIG. 10 can be implemented in one or more data processing systems, such as data processing systems 104, 106, 110, 112, and 114 in FIG. 1 and data processing system 200 shown in FIG. 2. The method shown in FIG. 10 can be implemented among multiple computers over a network, such as network 102 shown in FIG. 1.

As in FIG. 7, solution model 702, resources 400, constraints 402, and political concerns 706 are provided to optimization engine 704. In conjunction with optional feedback 708, optimization engine creates optimized major information technology project 302 having optimally selected sub-projects 710. However, the method shown in FIG. 10 details solution model 702.

Construction of solution model 702 begins with creating output object definitions 1002. Output objects are those outputs or deliverables that the project is designed to deliver. Specific examples of output objects include screen shots showing particular information, pictures, or query results; reports; services delivered; applications; queries; and others. Output objects are decomposed into three types of conceptual data objects: output data objects, process data objects, and connector data objects that connect the former two data objects. Output data objects are data objects that represent data and data structures, such as databases and other similar data objects. Process data objects are data objects that represent processes used to create the output objects, such as applications, algorithms, and flows.

For example, an output object could be a report. Decomposing this output object results in a corresponding output data object that is data that identifies or represents the report. Additionally, the report is decomposed into the logical processes used to create the report. Continuing the example, the each of three applications, algorithms, or flows used to create the report are identified and represented as a data object that can be called an output process object.

The sum of decomposed output data objects are then collected and assimilated into "to be" data model 1004. "To-be" data model 1004 is a model of all output data objects, data structures desired or needed for the output data objects, and any other data objects desired to implement optimized major information technology project 302. "To be" data model 1004 is data assembled into data models appropriate to producing one or more optimized sub-projects. A "to be" data structure therefore includes one or more data objects, as defined above.

Different parts of "to be" data model 1004 may be at different levels of completeness. Thus, an example of "to be" data model 1004 is a data structure that shows the "skeleton" of a massive database that is to be constructed. Although not all information regarding the future database is available, the "to be" model of the database describes the structure of the database and what information it should contain.

Similarly, the sum of decomposed output process objects are collected and assimilated into "to be" process model 1006. "To-be" process model 1006 is a model of processes and flows desired to implement optimized major information technology project 302. "To be" process model 1006 is data assembled into data models appropriate to producing one or more optimized sub-projects. A "to be" process therefore includes one or more data objects, as defined above.

Different parts of "to be" process model 1006 may be at different levels of completeness. Thus, an example of "to be" data model 1006 is an application that has not yet been written or that is incomplete. Although not all information regarding the future application is available, the "to be" model of the application describes the structure of the application and what information it should contain.

Next, "to be" data model 1004 and "to be" process model 1006 are arranged into value clusters. Possibly, connector data objects generated during output object definition 1002 are also integrated into value clusters 1008. A value cluster is the discrete intersection of data and that data's ability to add value to an organization. A value cluster may also be considered a group of resources that, when taken together, support one or more output objects having a utility value to an organization.

Value clusters 1008 may be considered a group of data value clusters, process value clusters, and connector value clusters. Each data value cluster includes one or more data sources that support one or more data objects. Each process value cluster includes one or more logical processes that support one or more output objects.

Value clusters 1008 are then related to each other using affinity matrix 1010. Affinity matrix 1010 is a matrix of data that indicates a relationship between groups of data sources and groups of output objects, and/or groups of available logical processes and groups of output objects. The affinity matrix describes data sources and output objects in terms of what output objects are available based on what data sources are available. Thus, for example, the affinity matrix can allow a user to determine that if Output Object "X" is available because its data sources are available, then Output Object "Y" and Output Object "Z" are also available because they use similar data sources.

Values clusters 1008, through affinity matrix 1010 are provided to optimization engine 704. Optimization engine 704 then performs mathematical optimization operations, taking as input affinity matrix 1010.

Returning to "to be" data model 1004, additional considerations are taken into account. For example, "to-be" data structures are mapped to "as-is" data structures, taking as input data source 1014. An "as-is" data structure is an existing data structure. Often, "as-is" data or data structures are not in a format compatible with final optimized major information technology project 302. Thus, the mapping of "to-be" data and data structures to "as-is" data and data structures is characterized as a conceptual data object.

Together with source data quality scoring 1016, mapping 1012 is modeled according to transformation issues 1018. Transformation issues 1018 are rigorously defined transformation risks and problems involved with mapping 1012 "to be" data and data structures to "as-is" data and data structures. Examples of transformation issues 1018 include estimated costs for source to target conversion, estimated risk for source to target conversion, and other similar issues.

As described above, when considered as a whole output object definition 1002, "to be" data model 1004, "to be" process model 1006, value clusters 1008, affinity matrix 1010, "to be" to "as is" mapping 1012, source data 1014, source data quality scoring 1016, and transformation issues 1018 form solution model 702. Solution model 702 is provided as input into optimization engine 704, along with resources 400, constraints, 402, political concerns 706, and feedback 708. As a result of performing optimization, a deterministic optimized major information technology project 302 is produced with optimally selected sub-projects 710.

FIGS. 11 through 25 illustrate various components and aspects of the features of FIG. 10. Thus, corresponding reference numerals in the different figures refer to the same features.

Figures 11, 12:
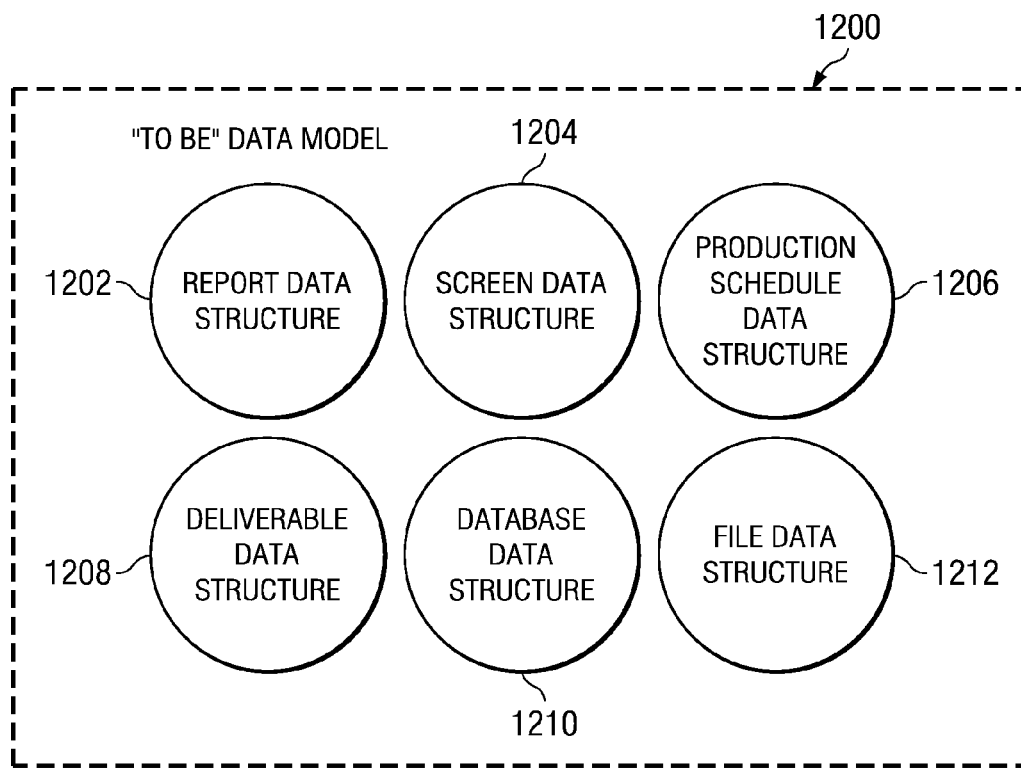
FIG. 11 is an exemplary output object valuation matrix, in accordance with an illustrative embodiment.
FIG. 12 is a block diagram of a "to be" data model, in accordance with an illustrative embodiment.

FIG. 11 is an exemplary output object valuation matrix, in accordance with an illustrative embodiment. An output object valuation matrix reflects valuation data, which is data that describes the value of an output object or a resource to an organization. An output object valuation matrix can be implemented as data and a data structure usable by a data processing system, such as data processing systems 104, 106, 110, 112, and 114 in FIG. 1 and data processing system 200 shown in FIG. 2. Exemplary output object valuation matrix 1100 shown in FIG. 11 can be implemented among multiple computers over a network, such as network 102 shown in FIG. 1. Additionally, output object valuation matrix 1100 shown in FIG. 11 describes the value of various projects, such as optimized sub-projects 800 through 812, to an organization. Output object valuation matrix 1100 is useful for determining affinity matrix 1010 in FIG. 10 and can also be used as input in optimization engine 704.

As shown in FIG. 11, columns 1102 reflect various sub-organizations within the overall organization. Rows 1104 reflect projects. Different sub-organizations within the organization can value different projects differently. Output object valuation matrix takes these different valuations into account when creating an optimized major information technology project for which optimized sub-projects are selected.

Rows 1104 include information technology sub-project 1106, management sub-organization 1108, marketing sub-organization 1110, and production sub-organization 1112. Additional sub-organizations or different sub-organizations could exist.

Columns include project 1 1114 and project 2 1116. Examples of projects could include an optimized sub-project, as described above. Additional projects or a different number of sub-projects could exist. A specific example of a project could include establishing a database, creating an application, generating a graphical user interface, or any other project.

An intersection of a row and a column can be referred to as a cell. Each cell contains a real number. The real number is a relative valuation of a project to an organization. High numbers reflect greater importance. Low numbers reflect lower importance. A zero indicates that a project has no importance to the organization. A negative number indicates that a project is a detriment to the organization.

For example, project 1 1114 has a value of 100 to management sub-organization 1108 and project 2 1116 has a value of 400 to management sub-organization 1108. Thus, project 2 1116 is considered to be much more important to the management sub-organization 1108 than project 1 1114. Similarly, both project 1 1114 and project 2 1116 are more important to management sub-organization 1108 than to the other sub-organizations.

In turn, project 1 1114 has no value to marketing sub-organization 1110. For example, project 1 could be creation of a database with which marketing sub-organization 1110 does not interact.

However, project 1 1114 has a negative value to production sub-organization 1112. For example, project 1 1114 could interfere with operation of production sub-organization 1112 because project 1 1114 drains production sub-organization 1112 of resources needed by that organization. This fact could motivate a change in project 1, a change in production sub-organization 1112, or a change in some other part of major information technology project 302 shown in FIG. 3.

FIG. 12 is a block diagram of a "to be" data model, in accordance with an illustrative embodiment. "To be" data model 1200 corresponds to "to be" data model 1004 in FIG. 10.

A "to be" data model includes a group of "to be" data structures and "to be" data. The phrase "to be", as used herein, describes something that is desired for the major information technology project that may, or may not, yet exist. A "to be" data structure is data assembled into data models appropriate to producing one or more output objects. A "to be" data structure therefore includes one or more data objects, as defined above. Different parts of the "to be" data model may be at different levels of completeness. An example of a "to be" data structure is a data structure that shows the "skeleton" of a massive database that is to be constructed. Although not all information regarding the future database is available, the "to be" model of the database describes the structure of the database and what information it should contain.

Examples of "to be" data structures in "to be" data model 1200 include report data structure 1202, screen data structure 1204, production schedule data structure 1206, deliverable data structure 1208, database data structure 1210, and file data structure 1212. Additional "to be" data structures or different "to be" data structures could be included in "to be" data model 1200.

Report data structure 1202 could be a data structure detailing data or data structures desired, whether available or not, for a report output object. Similarly, screen data structure 1204 could be a data structure detailing data or data structures desired, whether available or not, for a screen output object. Likewise, production schedule data structure 1204 could be a data structure detailing data or data structures desired, whether available or not, for a production schedule output object. Likewise, deliverable data structure 1206 could be a data structure detailing data or data structures desired, whether available or not, for a deliverable output object. Likewise, database data structure 1210 could be a data structure detailing data or data structures desired, whether available or not, for a database output object. Finally, file data structure 1212 could be a data structure detailing data or data structures desired, whether available or not, for a file output object.

Taken together, the set of all "to be" data structures, and possibly relationships among the "to be" data structures, form "to be" data model 1200. "To be" data model 1200 will then be used as shown in FIG. 10.

Figure 13:
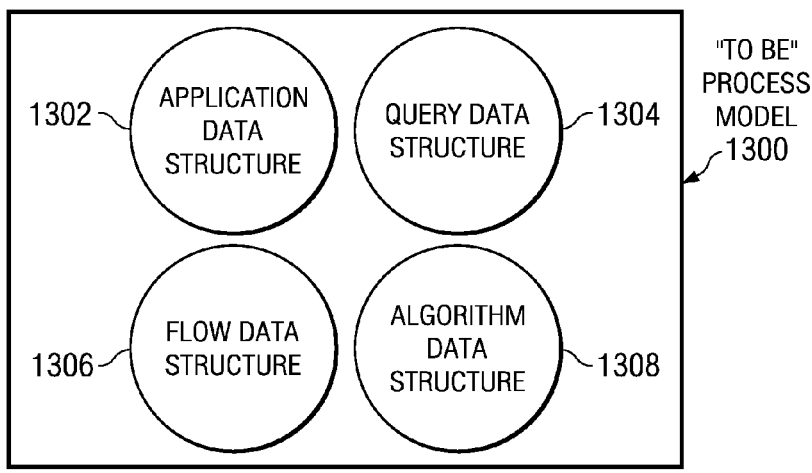
FIG. 13 is a block diagram of a "to be" process model, in accordance with an illustrative embodiment.

FIG. 13 is a block diagram of a "to be" process model, in accordance with an illustrative embodiment. "To be" data model 130 corresponds to "to be" data model 1006 in FIG. 10.

A "to be" process model includes a group of "to be" data structures and "to be" data reflective of a process used to implement an output object. The phrase "to be", as used herein, describes something that is desired for the major information technology project that may, or may not, yet exist. Different parts of the "to be" process model may be at different levels of completeness. An example of a "to be" data structure in a "to be" process model is a data structure that describes a massive application to be used in the major information technology project. Although not all information regarding the future application is available, the "to be" model of the application describes the structure of the application and what capabilities it should have.

Examples of "to be" data structures in "to be" process model 1300 include application data structure 1302, query data structure 1304, flow data structure 1306, and algorithm

1308. Additional "to be" data structures or different "to be" data structures could be included in "to be" process model 1300.

Application data structure 1302 could be a data structure detailing data or data structures desired, whether available or not, for an application output object. Similarly, query data structure 1304 could be a data structure detailing data or data structures desired, whether available or not, for a query output object. Likewise, flow data structure 1306 could be a data structure detailing data or data structures desired, whether available or not, for a flow output object. Finally, algorithm data structure 1308 could be a data structure detailing data or data structures desired, whether available or not, for an algorithm output object.

Taken together, the set of all "to be" process data structures, and possibly relationships among the "to be" process data structures, form "to be" process model 1300. "To be" process model 1300 will then be used as shown in FIG. 10.

Figure 14:
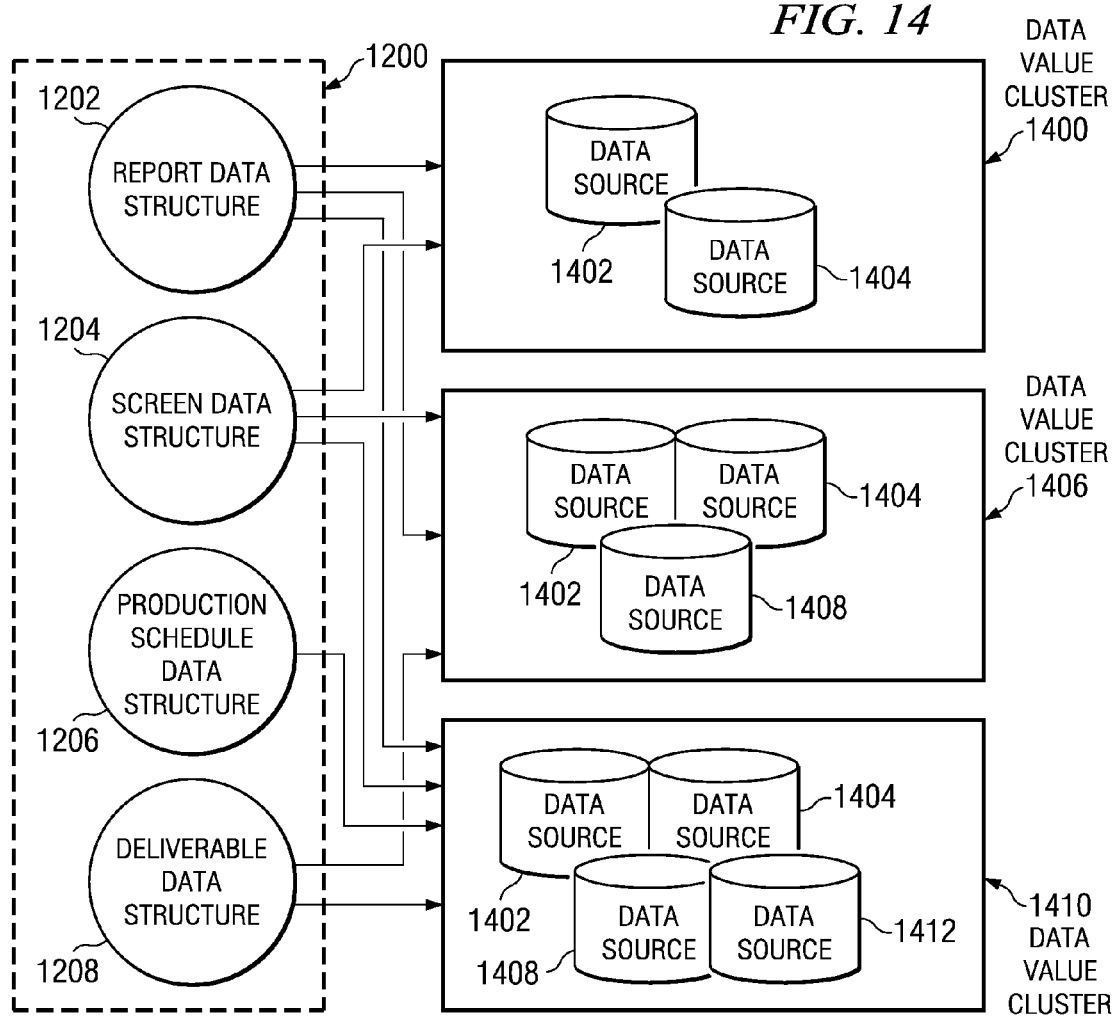
FIG. 14 is a block diagram illustrating data value clusters, in accordance with an illustrative embodiment.

FIG. 14 is a block diagram illustrating data value clusters, in accordance with an illustrative embodiment. The process of forming data value clusters can be implemented using a data processing system, such as data processing systems 104, 106, 110, 112, and 114 in FIG. 1 and data processing system 200 shown in FIG. 2. Data value clusters can be implemented among multiple computers over a network, such as network 102 shown in FIG. 1. As described above, a data value cluster is the discrete intersection of data and that data's ability to add value to an organization.

To form data value clusters, data structure models from "to be" data model 1200 are associated with different common data sources in data value clusters. For example, data value cluster 1400 includes data source 1402 and data source 1404. Report data structure model 1202 and screen data structure model 1204 each take advantage of these data sources in data value cluster 1400. Report data structure model 1202 also takes advantage of data value cluster 1406, which contains data source 1402, data source 1404, and data source 1408. Report data structure model 1202 also takes advantage of data value cluster 1410, which includes data source 1402, data source 1404, data source 1408, and data source 1412. Different data structure models are associated with different data value clusters as shown.

Structurally, data value clusters are implemented using matrices. Each value cluster is analyzed for its political and economic value to an organization or activities of an organization. Political power is expressed as a floating point number between 0.0 and positive infinity. Zero is totally powerless and positive infinity is an organization that receives anything it requests, if within the power of the organization. Example corporate organizations with a political power of infinity are the audit, compliance, and Sarbanes-Oxley compliance organizations. Other legal, tax, and environmental laws must be complied with, so no tradeoffs exist versus normal organizational goals. Most normal organizations would have a scaled political power value between 0.0 and 1.0. The absolute values of political power do not matter, only the political power ratio effects value cluster selection.

For example, relative political power can be objectively quantified in data value clusters using the following mathematics. Initially, an organization index is produced, where, $$0 \leq PP_{X=1}^{N} \leq \infty$$

Where X is the organizational index from 1 to N organizations.

Each of the value clusters provides some non-negative value to each of the X organizations. For the C value clusters projects considered by the planning unit, the value of each proposed cluster is:

$$0 \leq VC_{X,C}$$

Where X is the organization index and C is the index of the value cluster, and VC is the value cluster.

For each value cluster there exists a cost to extract, transform, and load the data to provision a particular value cluster. That cost is a non-negative number, and the cost of each value cluster is less than or equal to the total budget available, as shown by the following inequality:

$$0 \leq Cost_{D=1}^{C} \leq Budget$$

Where C is the total number of value clusters and Budget is the total budget available.

The optimal value cluster selection is a binary vector composed of zeros and ones that indicates the selection and funding of particular projects. This binary vector can be considered the "answer". As the optimization algorithm is run, various combinations of value clusters are computed in an attempt to increase the total value of an objective function described below. This process is well known in the art.

$$Plan_{Y=1}^{C} \in 0,1$$

Where Plan sub Y is 1 if production of the corresponding value cluster is selected and zero otherwise.

The methods described herein maximize the total value of the selected value clusters for the entire organization subject to a series of constraints. The objective function that is maximized is:

$$\text{Maximize} \sum_{X=1}^{M} \sum_{Y=1}^{C} PP_X \cdot Plan_Y \cdot VC_{X,Y}$$

Where M=maximum organizational index and C=number of value clusters.

The production of a given value cluster may deliver value to more than one part of the organization. For instance, a new production planning system may deliver value to a manufacturing department by improving manufacturing efficiency. This same value cluster may also deliver value to the marketing department by allowing sales persons to know when a particular order for a given customer will ship. The shipping department may also receive value by being able to negotiate favorable shipping rates by more accurate prediction of shipping needs.

Constraint data are added to reflect various constraints on the organization, such as physical, financial, organizational, legal, ethical, staffing, infrastructure, scheduling, and operational realities. For example, the total costs for all selected value cluster projects is less than or equal to the total budget available, as reflected in the following equation:

Subject to:

$$0 \leq \sum_{Y=1}^{C} PP_Y \cdot Cost_Y \leq Budget$$

Where Cost sub Y is the cost of producing value cluster number j.

Other constraints may be added to reflect the managerial or political considerations of the organization. For instance, if every organizational unit must receive at least 5% of their requested cluster values, a possible constraint would be:

For all dept, $(\Sigma_{P=1}{}^C.05*VC_{X,P}) \leq (\Sigma_{Q=1}{}^C \text{Plan}_Q * VC_{X,Q})$ Where X=department index, Q=project index, and Plan sub Q is the value cluster selection vector.

Other mathematical constraints can be added to more accurately reflect physical realities and management objectives. Thus, value clusters are objective, data-centric objects, such as matrices, that can be used as inputs in an optimization engine.

Figure 15:
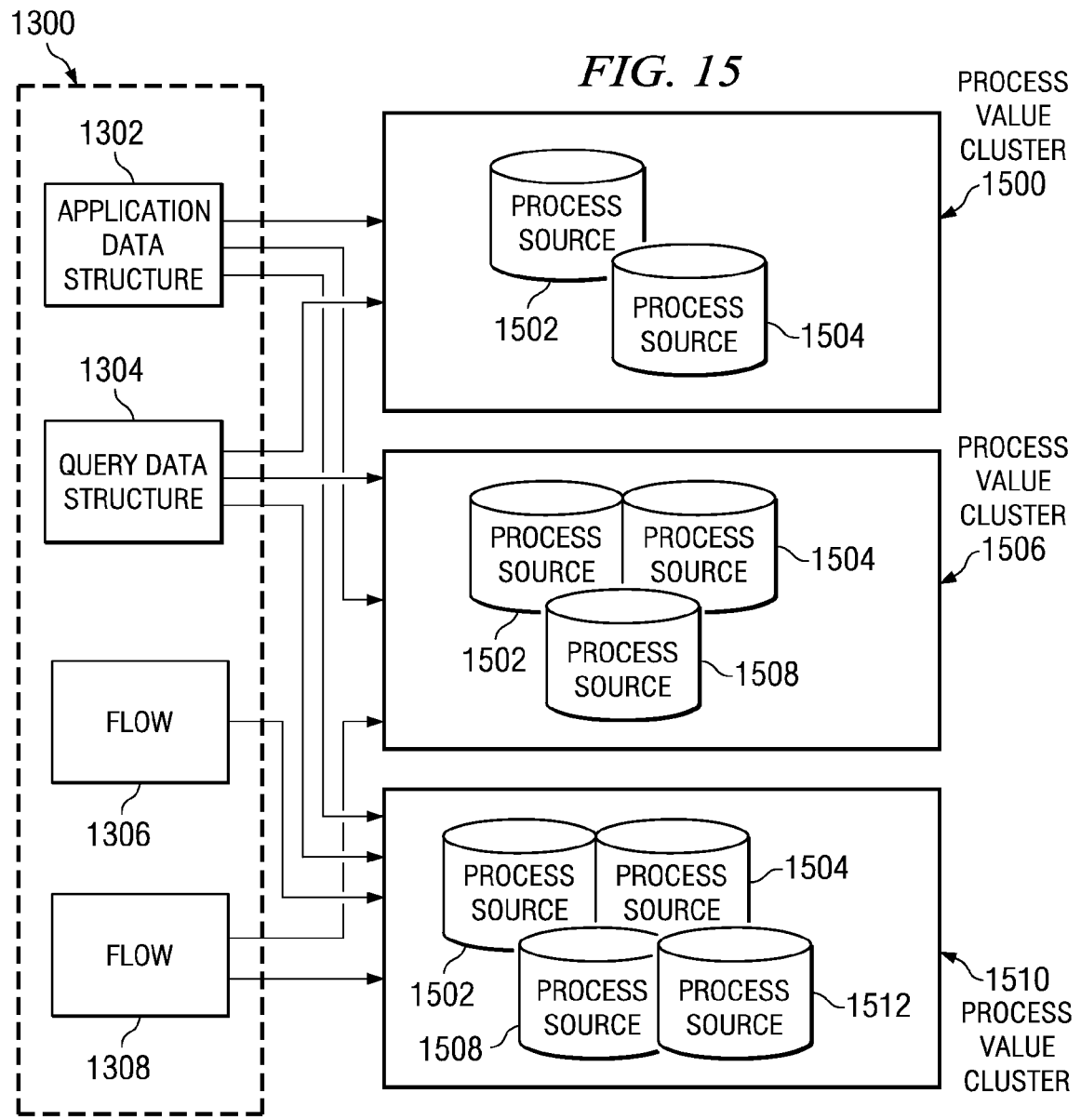
FIG. 15 is a block diagram illustrating process value clusters, in accordance with an illustrative embodiment.

FIG. 15 is a block diagram illustrating process value clusters, in accordance with an illustrative embodiment. The process of forming process value clusters can be implemented using a data processing system, such as data processing systems 104, 106, 110, 112, and 114 in FIG. 1 and data processing system 200 shown in FIG. 2. Process value clusters can be implemented among multiple computers over a network, such as network 102 shown in FIG. 1.

To form process value clusters, process data structure models from "to be" process model 1300 are associated with different common process sources in process value clusters. A process source can be an existing application, algorithm, or flow, or a similar process that is to be developed. For example, process data value cluster 1500 includes process source 1502 and process source 1504. Application process data structure model 1302 and Application process data structure model 1304 each take advantage of these process sources in process value cluster 1500. Application process data structure model 1302 also takes advantage of process value cluster 1506, which contains process source 1502, process source 1504, and process source 1508. Application process data structure model 1302 also takes advantage of process value cluster 1510, which includes process source 1502, process source 1504, process source 1508, and process source 1512. Different process data structure models are associated with different process value clusters as shown.

FIG. 16 is a block diagram illustrating elements of a "to be" data model, in accordance with an illustrative embodiment. Data value clusters shown in FIG. 16 correspond to data value clusters shown in FIG. 14.

For example, data value cluster 1400, which contains data source 1402 and data source 1404, are related to a set of facts 1600. Set of facts 1600 refers to a variety of references, such as reference 1602, reference 1604, reference 1606, and reference 1608. Similarly, data value cluster 1406, which includes data sources 1402, 1404, and 1408, are related to set of facts 1610. Set of facts 1610 refers to a variety of references, such as reference 1612, reference 1614, reference 1616, and reference 1618. Likewise, data value cluster 1410, which includes data sources 1402, 1404, 1408, and 1412 are related to set of facts 1620. Set of facts 1620 refers to a variety of references, such as reference 1622, reference 1624, reference 1626, and reference 1628.

FIG. 16 shows that to obtain certain data certain data sources should be developed or accessed and to be able to satisfy requirements of a project. The shown boxes are connected to provide a classic representation of a data model. The data value clusters shown in FIG. 16 tie to those data that enable individual sub-projects to work by producing corresponding particular output objects.

Figure 17:
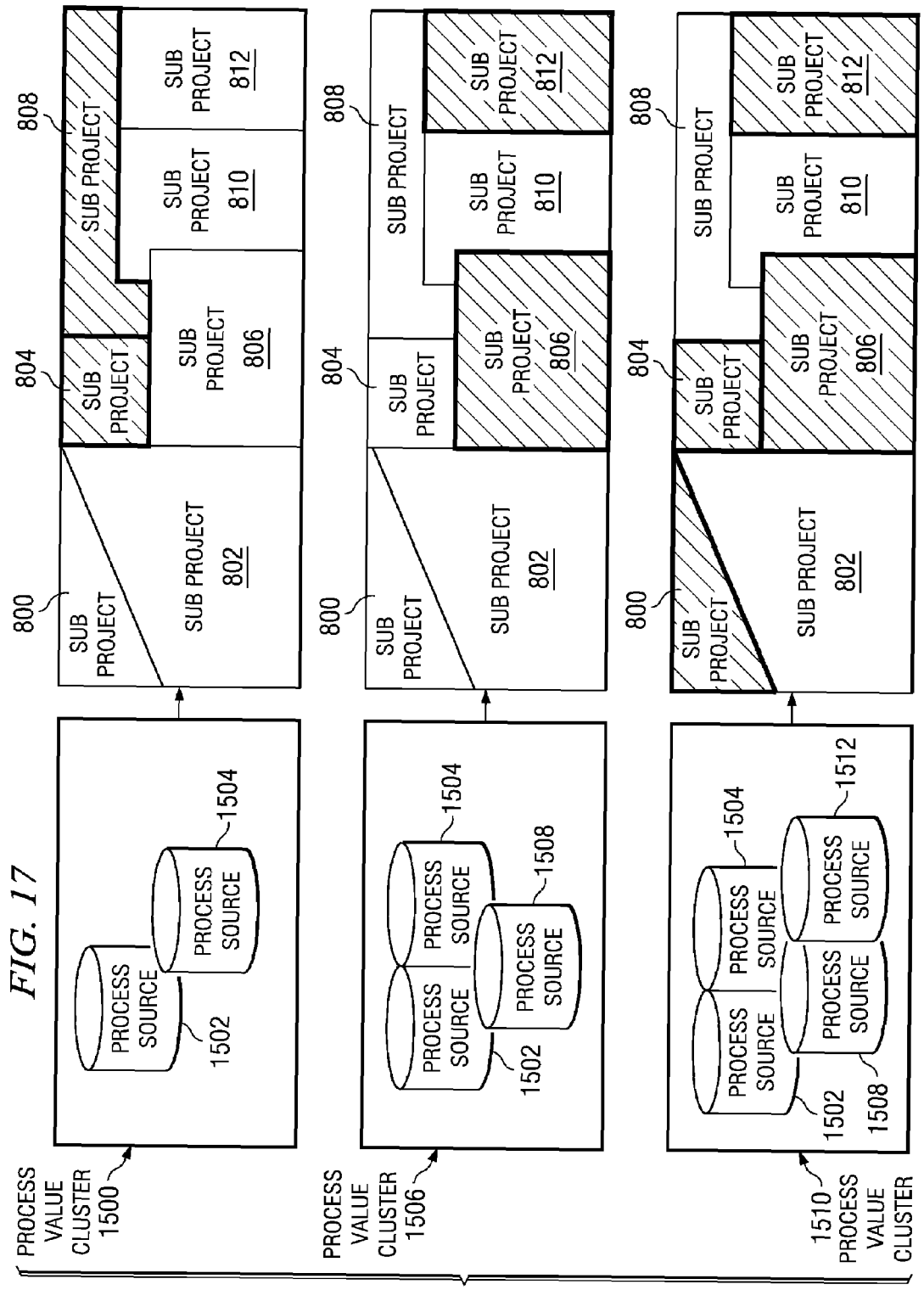
FIG. 17 is a block diagram illustrating elements of a "to be" process model, in accordance with an illustrative embodiment.

FIG. 17 is a block diagram illustrating elements of a "to be" process model, in accordance with an illustrative embodiment. Process value clusters shown in FIG. 17 correspond to process value clusters shown in FIG. 15.

Process value clusters correspond to different processes in various optimized sub-projects. For example, process value cluster 1500, which includes process sources 1502 and 1504 is used by optimized sub-project 804 and optimized sub-project 808. Similarly, process value cluster 1506, which includes process sources 1502, 1504, and 1508, is used by optimized sub-projects 806 and 812. Likewise, process value cluster 1510, which includes process sources 1502, 1504, 1508, and 1510, is used by optimized sub-projects 800, 804, 806, and 812.

The knowledge of how process value clusters relate to projects can be used to optimally select sub-projects for an optimized project. For example, if sub-projects 804 and 808 have been completed already, then process value cluster 1500 is also complete, which means that process source 1502 and process source 1504 are available. If process source 1508 were to be developed, then process value cluster 1506 would be completed. Thus, sub-project 806 and sub-project 812 would be easily finished. Thus, the process value clusters allow for detailed, data-centric planning of which sub-projects should be completed in what order. The process can be two-way: The completion of projects also allows process value clusters to be delivered.

FIG. 18 is an exemplary affinity matrix, in accordance with an illustrative embodiment. The process of forming an affinity matrix can be implemented using a data processing system, such as data processing systems 104, 106, 110, 112, and 114 in FIG. 1 and data processing system 200 shown in FIG. 2. An affinity matrix can be implemented among multiple computers over a network, such as network 102 shown in FIG. 1.

Affinity matrix 1800 is a matrix of data that indicates a relationship between groups of data sources and groups of output objects, and/or groups of available logical processes and groups of output objects. Affinity matrix 1800 describes data sources and output objects in terms of what output objects are available based on what data sources are available. Thus, for example, affinity matrix 1800 can allow a user to determine that if Output Object "X" is available because its data sources are available, then Output Object "Y" and Output Object "Z" are also available because they use similar data sources.

Specifically, affinity matrix 1800 has a series of columns 1802 reflecting existing data sources and a series of rows 1804 corresponding to data structures in FIG. 12 and FIG. 13. For columns 1802, existing data sources include "as-is" data sources and any data sources that have been completed during the course of constructing the major information technology project. Thus, affinity matrix 1800 evolves over time and can be adjusted as part of a feedback process, such as feedback 708 in FIG. 10. In the illustrative example shown, columns 1802 include data source column 1806, data source column 1808, data source column 1810, data source column 1812, and data source column 1814.

Affinity matrix 1800 also has a series of rows 1804 of data structures corresponding to data structures in FIG. 12 and FIG. 13. For example, rows 1804 include report data structure row 1202, screen data structure row 1204, production schedule data structure row 1206, deliverable data structure row 1208, application data structure row 1302, application data structure row 1304, flow data structure row 1306, and flow data structure row 1308. Rows 1804 also include personal skills program data structure row 1818 and opportunities database for sales data structure row 1820. Rows 1818 and 1820 are newly added data structures corresponding to newly added output objects as a result of a feedback process. Thus, again, affinity matrix 1800 evolves over time and can be adjusted as part of a feedback process, such as feedback 708 in FIG. 10.

An intersection of a column and a row can be referred to as a cell. Each cell has a number that is either zero or one. A zero indicates that a data source is not needed or is incomplete for a particular output object data structure in rows 1804. A one indicates that a data source exists and is used for a particular output object data structure in rows 1804. For this reason, as the major information technology project proceeds towards completion, more ones will appear in affinity matrix 1800 until every cell has a one when the major information technology project is completed. Thus, for example, report data structure 1202 either does not rely on or does not yet have available data sources 1806, 1808, 1810, and 1812; however, report data structure 1202 uses data source 1814. Furthermore, data source 1814 also exists and is available.

Affinity matrix 1800 can be used to estimate the ease or difficulty of adding new output objects to the major information technology project. For example, personal skills program data structure 1818 has a one in column 1808 and opportunities database for sales data structure 1820 has a one in column 1808 and column 1814. Given that ones already exist for these columns in other rows, such as row 1208, one can immediately ascertain that at least those data sources already exist and are completed. In fact, a one exists in at least one row for every column in affinity matrix 1800. Thus, assuming that the personal skills program and opportunities database for sales output objects do not use some other data source not reflected in columns 1802, one can also immediately ascertain that adding the personal skills program and opportunities database for sales output objects would be relatively simple. Adding these output objects would be relatively simple because the data sources upon which these output rely already exist and are completed.

Figure 19:
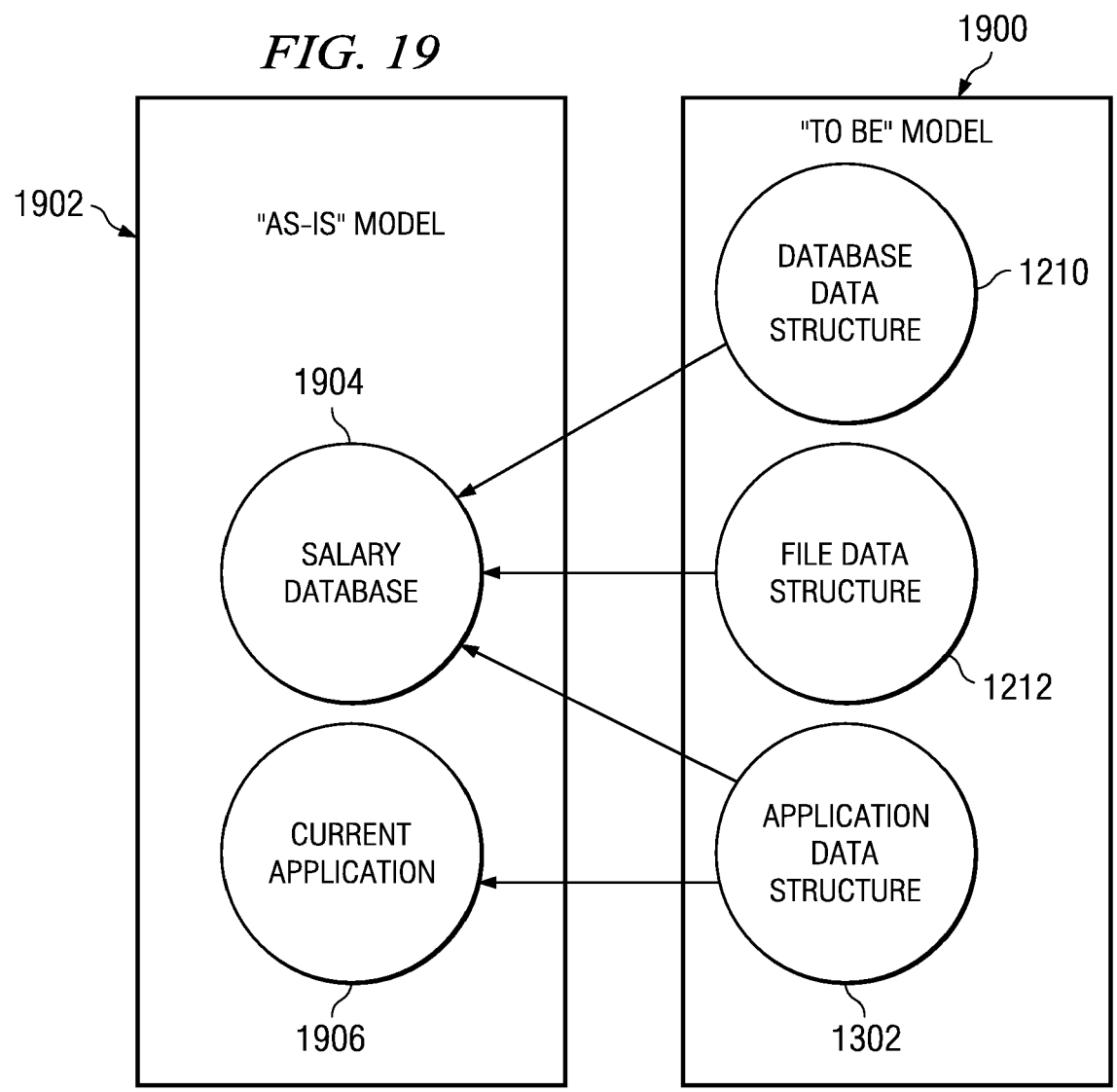
FIG. 19 is a block diagram illustrating mapping from an "as-is" model to a "to be" model, in accordance with an illustrative embodiment.

FIG. 19 is a block diagram illustrating mapping from an "as-is" model to a "to be" model, in accordance with an illustrative embodiment. FIG. 19 corresponds to mapping 1012 in FIG. 10. The mapping process shown in FIG. 19 can be implemented using a data processing system, such as data processing systems 104, 106, 110, 112, and 114 in FIG. 1 and data processing system 200 shown in FIG. 2. The mapping process shown in FIG. 19 can be implemented among multiple computers over a network, such as network 102 shown in FIG. 1.

"To be" model 1800 is mapped to "as-is" model 1802. During this process, "to be" data structures and "to be" process models are mapped to "as-is" data structures and "as is" processes. This mapping does not map all "to be" data structures and "to be" processes to all desired underlying data structures and processes, but rather to those data structures and processes that already exist. Thus, the mapping process shown in FIG. 19 describe how "to be" data structures and "to be" processes can take advantage of existing, or "as is", data structures and existing, or "as is", processes.

In the example shown in FIG. 19, database data structure 1210, file data structure 1212, and application data structure 1302 are all mapped to salary database 1904, which is an existing database. In other words, each of data structures 1210, 1212, and 1302 take advantage of or use salary database 1904. However, only application data structure 1302 takes advantage of or uses current application 1906. Thus, application data structure 1302 is mapped to current application 1906.

Figure 20:
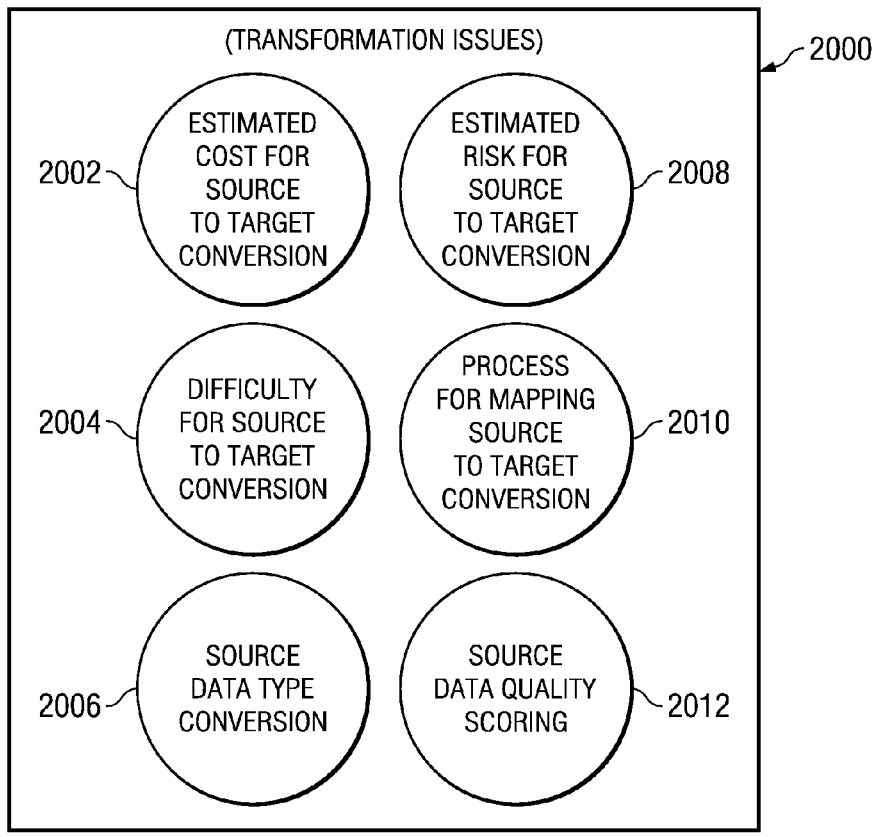
FIG. 20 is a block diagram illustrating transformation issues applied to the mapping from an "as-is" model to a "to be" model, in accordance with an illustrative embodiment.

FIG. 20 is a block diagram illustrating transformation issues applied to the mapping from an "as-is" model to a "to be" model, in accordance with an illustrative embodiment. FIG. 20 corresponds to transformation issues 1018 in FIG. 10. The transformation issues shown in FIG. 20 can be described as data in a data processing system, such as data processing systems 104, 106, 110, 112, and 114 in FIG. 1 and data processing system 200 shown in FIG. 2. The transformation issues described in FIG. 20 can be implemented among multiple computers over a network, such as network 102 shown in FIG. 1.

Transformation issues 2000 are issues regarding transforming "as is" data structures and processes into "to be" data structures and processes. Transformation issues 2000 are quantitative factors that are defined and then provided as input to an optimization engine, such as optimization engine 704 in FIG. 7 and FIG. 10.

Examples of transformation issues include an estimated cost for source to target conversion 2002. This cost can be estimated and quantified, with the quantified value included as input in the optimization engine. Similar quantitative transformation issues include a quantitative assessment of the difficulty for source to target conversion 2004, source data type conversion 2006, estimated risk for source to target conversion 2008, process for mapping source to target conversion 2010 and source data quality scoring 2012.

FIG. 21 is a block diagram illustrating exemplary available resources, in accordance with an illustrative embodiment. FIG. 21 corresponds to resources 400 in FIG. 4 and in FIG. 10. Available resources 2100 in FIG. 21 can be described as data in a data processing system, such as data processing systems 104, 106, 110, 112, and 114 in FIG. 1 and data processing system 200 shown in FIG. 2. Available resources 2100 described in FIG. 21 can be implemented among multiple computers over a network, such as network 102 shown in FIG. 1. Additionally, available resources 2100 can be considered a type of boundary conditions provided as input into an optimization engine, such as optimization engine 704 in FIG. 7 and FIG. 10.

Available resources 2100 represent the accumulation of all available resources, as defined by the organization. Examples of available resources include physical computer equipment 2102, physical storage capacity 2104, training 2106, software 2108, money 2110, time available 2112, physical resources 2114 (such as buildings), network capability 2116, and personnel 2118. Available resources 2100 could be more, different, or fewer available resources than those shown in FIG. 21.

FIG. 22 is a block diagram illustrating exemplary project constraints, in accordance with an illustrative embodiment. FIG. 22 corresponds to constraints 402 in FIG. 4 and in FIG. 10. Project constraints 2200 in FIG. 22 can be described as data in a data processing system, such as data processing systems 104, 106, 110, 112, and 114 in FIG. 1 and data processing system 200 shown in FIG. 2. Project constraints 2200 described in FIG. 22 can be implemented among multiple computers over a network, such as network 102 shown in FIG. 1. Additionally, project constraints 2200 can be considered a type of boundary conditions provided as input into an optimization engine, such as optimization engine 704 in FIG. 7 and FIG. 10.

Project constraints 2200 represent the accumulation of all constraints, as defined by the organization. Examples of project constraints include problems in software, network, database, hardware mandates, and performance characteristics 2202. Other project constraints include data structure compatibility issues 2204, data quality issues 2206, database compatibility issues 2208, data quality 2210, team location and travel constraints 2212, cash shortages 2214, organizational rigidity 2216, personal restrictions 2218, organizational policies 2220, information transfer policies 2222, legal constraints 2224, classified information policies 2226, HIPAA or other privacy rules 2228, hazardous information restrictions 2230, risk tolerance 2232, security requirements 2234, information technology (IT) policies 2236, development requirements 2238, and required delivery steps 2240. Project constraints 2200 could be more, different, or fewer available resources than those shown in FIG. 22.

Figure 23:
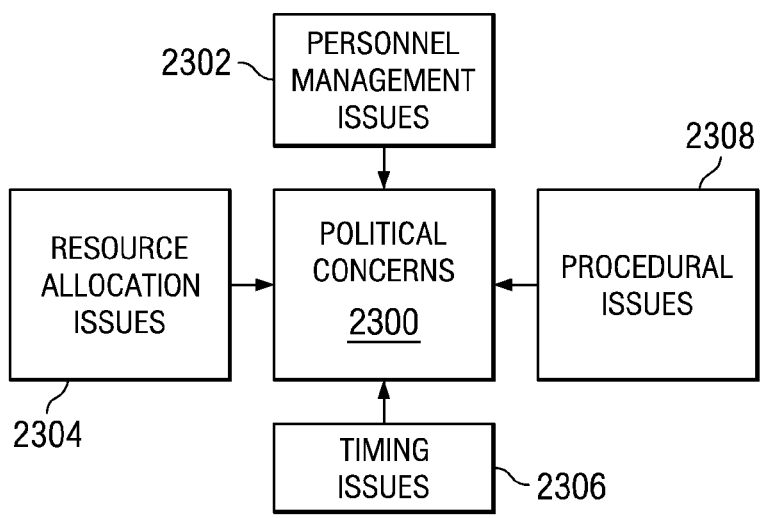
FIG. 23 is a block diagram illustrating exemplary political concerns, in accordance with an illustrative embodiment.

FIG. 23 is a block diagram illustrating exemplary political concerns, in accordance with an illustrative embodiment. FIG. 23 corresponds to political concerns 706 in FIG. 10. Political concerns 2300 shown in FIG. 23 can be described as data in a data processing system, such as data processing systems 104, 106, 110, 112, and 114 in FIG. 1 and data processing system 200 shown in FIG. 2. Political concerns 2300 described in FIG. 23 can be implemented among multiple computers over a network, such as network 102 shown in FIG. 1. Additionally, political concerns 2300 can be considered a type of boundary conditions provided as input into an optimization engine, such as optimization engine 704 in FIG. 7 and FIG. 10.

Political concerns 2300 represent the accumulation of all political concerns, as defined by the organization. Examples of project concerns include personnel management issues 2302, resource allocation issues 2304, timing issues 2306, and procedural issues 2308. Each exemplary political concern 2302 through 2308 is quantified as a number so that a corresponding political concern can be processed by an optimization engine.

Examples of personnel management issues 2302 include preventing certain types of employees from interacting with each other. For example, a large law firm might desire to avoid having certain employees interact with each other in order to maintain certain privacy issues. Examples of resource allocation issues 2304 include a desire by an organization to require that for every dollar received by organization A, organization B should also receive two dollars. An example of timing issues 2306 is a desire by an organization to produce deliverables in a particular order or within a particular time period. Examples of procedural issues 2308 include a desire by an organization to require that a particular individual within an organization receive a particular report before some other individual in the organization.

FIG. 24 is a block diagram illustrating examples of feedback applied to an optimization engine, in accordance with an illustrative embodiment. FIG. 24 corresponds to feedback 708 in FIG. 10. Feedback 2400 shown in FIG. 24 can be described as data in a data processing system, such as data processing systems 104, 106, 110, 112, and 114 in FIG. 1 and data processing system 200 shown in FIG. 2. Feedback 2400 described in FIG. 24 can be implemented among multiple computers over a network, such as network 102 shown in FIG. 1.

Feedback 2400 includes changes made to the input provided to the optimization engine. Examples of feedback include a reasonableness assessment 2402, feasibility assessment 2404, sensitivity analysis 2406, and change in deliverables 2408. Each exemplary type of feedback 2402 through 2408 is quantified as a number so that the optimization engine can re-perform an optimization after receiving the corresponding feedback.

Examples of reasonableness assessment include an assessment by one or more individuals whether a particular result is desirable. A reasonableness assessment can result in one or more adjustments to one or more inputs to the optimization engine. Although a reasonableness assessment involves human input, a reasonableness assessment is either quantified or results in a quantified change to an input in an optimization engine. An example of a feasibility assessment 2404 includes an assessment by one or more individuals that a particular result is feasible. A feasibility assessment can result in one or more adjustments to one or more inputs to the optimization engine. Although a feasibility assessment involves human input, a feasibility assessment is either quantified or results in a quantified change to an input in an optimization engine.

An example of sensitivity analysis 2406 is to adjust slightly one or more inputs to the optimization engine and then to re-execute the optimization process. If the final result changes dramatically as a result of a slight adjustment, then the optimized solution, which is the optimized major information technology project, is considered fragile. Fragile solutions are undesirable because they are subject to a high degree of risk. Thus, one or more elements of the solution model might be adjusted in order to produce a stable solution that is not a fragile solution.

An example of a change in deliverables is a change in the desired output objects. For example, an organization might desire to produce more, fewer, or different output objects as the planning the major information technology project proceeds. Changes in these output objects change the inputs to the optimization engine.

FIG. 25 is a block diagram illustrating a computer-implemented method of creating optimized sub-projects for a major information technology project, in accordance with an illustrative embodiment. The method shown in FIG. 25 can be implemented in one or more data processing systems, such as data processing systems 104, 106, 110, 112, and 114 in FIG. 1 and data processing system 200 shown in FIG. 2. The method shown in FIG. 25 can be implemented among multiple computers over a network, such as network 102 shown in FIG. 1.

FIG. 25 summarizes the counter-intuitive method of selecting a set of optimized sub-projects into a plan for creating an optimal project definition. Instead of proceeding from a "right to left" perspective shown in the prior art method of FIG. 4, the illustrative embodiment shown in FIG. 25 solves the problem of planning a major information technology problem from "left to right."

In brief summary, input 2500 is fed into optimization engine 2502. Input 2500 includes solution model 702 shown in FIG. 7 and FIG. 10. Input 2500 also includes boundary conditions. Boundary conditions include resources 400 and constraints 402, shown in FIG. 4 and FIG. 10, as well as political concerns, shown in FIG. 7 and FIG. 10. Input 2500 also includes feedback 708, shown in FIG. 7 and FIG. 10. Input can also include other data, if desired.

A mathematical optimization operation is then performed on input 2500 during optimization 2502. As described above, optimization operations are known and have been implemented in available software. As a result of the optimization operation, optimized sub-projects 2504 are selected for major information (IT) project 2506.

FIG. 26 is a flowchart illustrating a computer-implemented method of creating optimized sub-projects for a major information technology project, in accordance with an illustrative embodiment. The method shown in FIG. 26 can be implemented in one or more data processing systems, such as data processing systems 104, 106, 110, 112, and 114 in FIG. 1 and data processing system 200 shown in FIG. 2. The method shown in FIG. 26 can be implemented among multiple computers over a network, such as network 102 shown in FIG. 1. The term "processor" as used in the description of FIG. 26 refers to one or more processors that are possibly connected via a network. The definitions of various terms used with respect to the description of FIG. 26, and the interactions of corresponding objects, can be found in the description of FIG. 7 through FIG. 24.

The process shown in FIG. 26 begins along two simultaneous paths. Along the first path, the processor receives input regarding output objects (step 2600). The processor then receives valuation data for output objects (step 2602).

From that point, simultaneously the processor both receives input regarding "as-is" data sources (step 2604) and also begins decomposing output objects. Specifically, the processor decomposes output objects into data objects (step 2606) and decomposes output objects into logical processes used to create the output objects (step 2610).

After decomposing output objects into data objects at step 2606, the processor organizes data objects into "to be" data structures. Simultaneously, the processor determines value clusters (step 2612) from the logical processes used to create the output objects at step 2610 and from the "to be" data structures at step 2608. The processor then creates an affinity matrix (step 2614) using the information gained form the value clusters determined in step 2612.

Returning to steps 2604 and 2608, the processor thereafter maps "to be" data structures organized in step 2608 to "as-is" data sources received in step 2604 (step 2616). The processor then determines processes for getting data from the source to the target (step 2618). Step 2618 is similar to transformation issues block 1018 in FIG. 10.

Returning to the start of the process, the processor also receives data regarding resources (step 2620), data regarding constraints (step 2622) and data regarding political concerns (step 2624). Steps 2620, 2622, and 2624 can be performed in parallel or in a different order shown in FIG. 26.

Next, the affinity matrix created in step 2614, the processes for getting data from the source to the target in step 2618, data regarding resources at step 2620, data regarding constraints at step 2622, and data regarding political concerns at step 2624 are provided as input into an optimization engine. The processor, using the optimization engine, then performs an optimization operation within the constraints provided (step 2626).

A determination is then made whether feedback is desired or required (step 2628). If feedback is desired or required, then the processor receives adjustments (step 2630). The process then returns to the start of the process and the entire process is repeated, though one or more steps of the process are modified or adjusted to take into account the feedback. However, if feedback is not desired or required, then the process terminates.

The output of the optimization engine can be stored in a storage device. The output of the optimization engine is the optimized project, having optimally selected optimized sub-projects. A storage device can be any storage suitable for storing data, such as but not limited to hard disk drives, random access memory, read only memory, tape drives, floppy disk drives, or any other data storage medium.

Thus, a computer-implemented method, computer program product, and data processing system are provided for creating optimized sub-projects for a project. Boundary conditions, input regarding output objects, and input regarding "as-is" data sources are received. The output objects are decomposed into data objects and the output objects are also decomposed into logical processes used to create the output objects. Value clusters are determined. The data objects are organized into "to be" data structures and the "to be" data structures are mapped to the "as-is" data sources. Additional processes are determined for moving data from a source to a target. An affinity matrix is created based on the value clusters. Finally, an optimization operation is executed with an optimization engine to produce the optimized sub-projects. The optimization engine takes as inputs the boundary conditions, the "as-is" data sources, the data objects, the logical processes used to create the output objects, the value clusters, the "to be" data structures; the mapping of the "to be" data structures to the "as-is" data sources, the additional processes for moving data from the source to the target, and the affinity matrix.

The embodiments described herein have several advantages over known methods for planning various types of projects, such as major information technology projects. For example, the embodiments described herein provide data centric solution models that result in deterministically optimized projects having optimally selected optimized sub-projects. Thus, the probability that a project planned with the embodiments described herein will succeed is much higher than projects planned with known methods. Additionally, projects planned according to the embodiments described herein are very likely to result in a final project that operates much more efficient than a final project planned with known methods.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for creating an optimally integrated information technology project for an organization, the computer-implemented method comprising:
   defining a solution model for an information technology project, wherein defining the solution model further comprises:
      receiving a first set of input regarding output objects, wherein the output objects are a set of outputs the information technology project is designed to deliver;
      receiving a second set of input regarding existing data sources;
         decomposing the output objects into output data objects and process data objects, wherein a processor decomposes the output objects into the data output objects and the process data objects;
      organizing the data output objects into future data structures;
      determining value clusters, wherein value clusters are comprised of data value clusters and process value clusters, wherein the data value clusters are comprised of matrices, wherein the matrices associate a set of values with a set of data sources based on a relationship between the data sources and the data output objects;
      creating an affinity matrix, wherein the affinity matrix is based on the data value clusters and the process value clusters, and wherein the affinity matrix is comprised of a set of rows and a set of columns, wherein the set of rows comprise a set of sub-projects, and wherein the set of columns are associated with the set of data sources, and wherein each cell in the affinity matrix comprises a number indicating whether a corresponding sub-project on a row accesses a data source among the set of data sources;
      mapping the future data structures to the existing data resources;
      producing the solution model for inputting into an optimization engine;
   receiving boundary conditions, wherein the boundary conditions are comprised of resource data, constraint data, and political concern data;
   determining transformation issues, wherein transformation issues comprise additional constraints for getting data from a source to a target through defined transformations;
   executing an optimization operation, wherein executing the optimization operation further comprises:
      inputting the solution model, the resource data, the constraint data, the political concern data, and the transformation issues into the optimization engine, wherein the optimization engine comprises a commercially available software program located on the processor, wherein the commercially available software program provides a set of results that mathematically define the optimized project as a set of data structures comprised of optimized sub-projects;
      receiving a set of adjustments for the optimized project produced from the optimization engine;
      repeating optimization and receiving the optimized project until feedback is no longer required on the set of results; and
      storing the optimized project in a storage device located on the processor.

2. The computer-implemented method of claim 1, wherein the information technology system project comprises one of a set of data processing systems, applications, the data, reports, flows, algorithms, databases, and other infrastructure used to maintain the data and operations of the organization.

3. The computer-implemented method of claim 1 further comprising the step of:
   selecting the of optimized sub-projects into a plan for creating an optimal project definition.

4. The computer-implemented method of claim 1 wherein resource data reflects resources available for the optimal project.

5. The computer-implemented method of claim 1, wherein the process data objects describe processes used to create the data output objects.

6. The computer-implemented method of claim 1 wherein the affinity matrix indicates a relationship between groups of the set of data sources and groups of the output objects, and indicates the relationship between groups of available logical processes and groups of the output objects.

7. The computer-implemented method of claim 1, wherein receiving the set of adjustments for the optimized project produced from the optimization engine further comprises:
   adjusting one of the boundary conditions, the output objects, the existing data sources, the data output objects, the logical processes used to create the output objects, the value clusters, the future data structures, the mapping of the future data structures to the existing data sources, the additional processes for moving data from the source to the target, the affinity matrix, and combinations thereof to form adjusted input; and
   re-executing the optimization operation, wherein the optimization engine takes as input the adjusted input.

8. The computer-implemented method of claim 1 wherein the output objects comprise one of screens, reports, queries, applications, deliverables, an interactive graphical user interface, and combinations thereof.

9. A computer program product stored on a recordable-type computer readable medium for creating an optimally integrated information technology project for an organization, the computer program product comprising:
   computer useable program code for defining a solution model for an information technology project, wherein defining the solution model further comprises:
      computer useable program code for receiving a first set of input regarding output objects, wherein the output objects are a set of outputs the information technology project is designed to deliver;
      computer useable program code for receiving a second set of input regarding existing data sources;
      computer useable program code for decomposing the output objects into output data objects and process data objects, wherein a processor decomposes the output objects into the data output objects and the process data objects;
      computer useable program code for organizing the data output objects into future data structures;

computer useable program code for determining value clusters, wherein value clusters are comprised of data value clusters and process value clusters, wherein the data value clusters are comprised of matrices, wherein the matrices associate a set of values with a set of data sources based on a relationship between the data sources and the data output objects;

computer useable program code for creating an affinity matrix, wherein the affinity matrix is based on the data value clusters and the process value clusters, and wherein the affinity matrix is comprised of a set of rows and a set of columns, wherein the set of rows comprise a set of sub-projects, and wherein the set of columns are associated with the set of data sources, and wherein each cell in the affinity matrix comprises a number indicating whether a corresponding sub-project on a row accesses a data source among the set of data sources;

computer useable program code for mapping the future data structures to the existing data resources; and computer useable program code for producing the solution model for inputting into an optimization engine;

computer useable program code for receiving boundary conditions, wherein the boundary conditions are comprised of resource data, constraint data, and political concern data;

computer useable program code for determining transformation issues, wherein transformation issues comprise additional constraints for getting data from a source to a target through defined transformations;

computer useable program code for executing an optimization operation, wherein executing the optimization operation further comprises:

computer useable program code for inputting the solution model, the resource data, the constraint data, the political concern data, and the transformation issues into the optimization engine, wherein the optimization engine comprises a commercially available software program located on the processor, wherein the commercially available software program provides a set of results that mathematically define the optimized project as a set of data structures comprised of optimized sub-projects;

computer useable program code for receiving a set of adjustments for the optimized project produced from the optimization engine;

computer useable program code for repeating optimization and receiving the optimized project until feedback is no longer required on the optimized project; and computer useable program code for storing the optimized project in a storage device located on the processor.

10. The computer program product of claim 9, wherein the information technology system project comprises one of a set of data processing systems, applications, reports, flows, algorithms, databases, and other infrastructure used to maintain the set of data and operations of the organization.

11. The computer program product of claim 9 further comprising the step of:

computer usable program code for selecting the set of optimized sub-projects into a plan for creating an optimal project definition.

12. The computer program product of claim 9, wherein the process data objects describe processes used to create the data output objects.

13. The computer program product of claim 9 wherein the affinity matrix indicates the relationship between groups of the set of data sources and groups of the output objects, and indicates the relationship between groups of available logical processes and groups of the output objects.

14. The computer program product of claim 9, wherein receiving the set of adjustments for the optimized project produced from the optimization engine further comprises:

adjusting one of the boundary conditions, the output objects, the existing data sources, the data output objects, the logical processes used to create the output objects, the value clusters, the future data structures, the mapping of the future data structures to the existing data sources, the additional processes for moving data from the source to the target, the affinity matrix, and combinations thereof to form adjusted input; and re-executing the optimization operation, wherein the optimization engine takes as input the adjusted input.

15. A data processing system comprising:

a processor;

a bus connected to the processor;

a computer usable medium connected to the bus, wherein the computer usable medium contains a set of instructions for creating an optimally integrated information technology project for an organization, wherein the processor is adapted to carry out the set of instructions:

to define a solution model for an information technology project, wherein defining the solution model further comprises:

to receive a first set of input regarding output objects, wherein the output objects are a set of outputs the information technology project is designed to deliver;

to receive a second set of input regarding existing data sources;

to decompose the output objects into output data objects and process data objects, wherein a processor decomposes the output objects into the data output objects and the process data objects;

to organize the data output objects into future data structures;

to determine value clusters, wherein value clusters are comprised of data value clusters and process value clusters, wherein the data value clusters are comprised of matrices, wherein the matrices associate a set of values with a set of data sources based on a relationship between the data sources and the data output objects;

to create an affinity matrix, wherein the affinity matrix is based on the data value clusters and the process value clusters, and wherein the affinity matrix is comprised of a set of rows and a set of columns, wherein the set of rows comprise a set of sub-projects, and wherein the set of columns are associated with the set of data sources, and wherein each cell in the affinity matrix comprises a number indicating whether a corresponding sub-project on a row accesses a data source among the set of data sources;

to map the future data structures to the existing data resources; and to produce the solution model for inputting into an optimization engine;

to receive boundary conditions, wherein the boundary conditions are comprised of resource data, constraint data, and political concern data;

to determine transformation issues, wherein transformation issues comprise additional constraints for getting data from a source to a target through defined transformations;

to execute an optimization operation, wherein executing the optimization operation further comprises the set of instructions:

to input the solution model, the resource data, the constraint data, the political concern data, and the transformation issues into the optimization engine, wherein the optimization engine comprises a commercially available software program located on the processor, wherein the commercially available software program provides a set of results that mathematically define the optimized project as a set of data structures comprised of optimized sub-projects;

to receive a set of adjustments for the optimized project produced from the optimization engine;

to repeat optimization and receiving the optimized project until feedback is no longer required on the optimized project; and storing the optimized project on a storage device located on the processor.

16. The data processing system of claim 15 wherein the information technology system project is one of a set of data processing systems, applications, reports, flows, algorithms, databases, and other infrastructure used to maintain the data and operations of the organization.

17. The data processing system of claim 15 wherein the processor is further adapted to carry out the set of instructions to:

select the set of optimized sub-projects into a plan for creating an optimal project definition.

18. The data processing system of claim 15 wherein the resource data reflects resources available for the optimal project.

19. The data processing system of claim 15 wherein the affinity matrix indicates a relationship between groups of the set of data sources and groups of the output objects, and indicates the relationship between groups of available logical processes and the groups of the output objects.

20. The data processing system of claim 15 wherein the processor is further adapted to carry out the set of instructions to:

adjust one of the boundary conditions, the output objects, the existing data sources, the data output objects, the logical processes used to create the output objects, the value clusters, the future data structures, the mapping of the future data structures to the existing data sources, the additional processes for moving data from the source to the target, the affinity matrix, and combinations thereof to form adjusted input; and re-execute the optimization operation, wherein the optimization engine takes as input the adjusted input.

* * * * *

UNITED STATES PATENT AND TRADEMARK OFFICE
CERTIFICATE OF CORRECTION

PATENT NO. : 7,584,160 B2
APPLICATION NO. : 11/553526
DATED : September 1, 2009
INVENTOR(S) : Robert R. Friedlander et al.

Page 1 of 1

It is certified that error appears in the above-identified patent and that said Letters Patent is hereby corrected as shown below:

Title Page, Item (75) Inventor
Kraemer, James R.; Santa Fe, NM, United States of America (The patent states Sante Fe, CA -- should be Sante Fe, NM)

Signed and Sealed this

Tenth Day of November, 2009

David J. Kappos
*Director of the United States Patent and Trademark Office*